(12) United States Patent
Payne et al.

(10) Patent No.: US 11,936,784 B2
(45) Date of Patent: *Mar. 19, 2024

(54) ATTESTED END-TO-END ENCRYPTION FOR TRANSPORTING SENSITIVE DATA

(71) Applicant: Oracle International Corporation, Redwood Shores, CA (US)

(72) Inventors: Brian Spencer Payne, Portland, OR (US); Saikat Chakrabarti, Pueblo, CO (US); Pratibha Anjali Dohare, Seattle, WA (US); Rehan Loring Iftikhar, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,344

(22) Filed: Jul. 15, 2022

(65) Prior Publication Data

US 2022/0407694 A1 Dec. 22, 2022

Related U.S. Application Data

(63) Continuation of application No. 16/997,387, filed on Aug. 19, 2020, now Pat. No. 11,444,762.

(51) Int. Cl.
*H04L 9/08* (2006.01)
*G06F 9/4401* (2018.01)

(52) U.S. Cl.
CPC .......... *H04L 9/0877* (2013.01); *G06F 9/4406* (2013.01); *H04L 9/0825* (2013.01); *H04L 9/0844* (2013.01); *H04L 2209/127* (2013.01)

(58) Field of Classification Search
CPC ... H04L 9/0877; H04L 9/0825; H04L 9/0844; H04L 2209/127; H04L 9/088;
(Continued)

(56) References Cited

U.S. PATENT DOCUMENTS 11,489,672 B2 * 11/2022 Linton .................. H04L 9/0838
2005/0039034 A1 * 2/2005 Doyle .................. H04L 9/0825
713/193

(Continued)

OTHER PUBLICATIONS

U.S. Appl. No. 16/997,387, Notice of Allowance, dated May 16, 2022, 9 pages.

*Primary Examiner* — Quazi Farooqui
(74) *Attorney, Agent, or Firm* — Invoke

(57) ABSTRACT

Techniques are disclosed for enabling attested end-to-end encryption for transporting data between devices. In one example, a destination device receives a policy profile that includes an origination key and a destination key, and the origination key corresponds to a public transfer key of a source device. The destination device verifies the policy profile based on the destination key corresponding to a public transfer key of the source device. The destination device receives a signed encrypted data encryption key from the source device. The destination device receives encrypted data from the source device. The destination device verifies the signed encrypted data encryption key originated from the source device based on the signed encrypted data key being signed with a private attestation identity key that corresponds to a public attestation identity key of the source device. The destination device decrypts encrypted data using a private transfer key of the destination device.

20 Claims, 12 Drawing Sheets

(58) Field of Classification Search
CPC ....... H04L 9/3247; H04L 9/0897; H04L 9/08; G06F 9/4406; G06F 9/4401
See application file for complete search history.

(56) References Cited

U.S. PATENT DOCUMENTS

| | | | |
|---|---|---|---|
| 2013/0159704 A1* | 6/2013 | Chandrasekaran | G06F 21/57 713/155 |
| 2017/0302459 A1* | 10/2017 | Fenner | H04L 9/3234 |
| 2020/0145409 A1* | 5/2020 | Pochuev | H04L 63/0853 |

* cited by examiner

ATTESTED END-TO-END ENCRYPTION FOR TRANSPORTING SENSITIVE DATA

CROSS-REFERENCE TO RELATED APPLICATIONS

This application is a continuation of U.S. application Ser. No. 16/997,387, filed Aug. 19, 2020, which is incorporated by reference.

BACKGROUND

Techniques exist for transmitting encrypted data between endpoint devices over an untrusted channel of communication. For example, a Public Key Infrastructure (PKI) may be used to facilitate transmission of sensitive data between entities in various contexts, including, for example, e-commerce, Internet banking, confidential email, cloud computing, etc. In one example, a PKI arrangement may bind public keys with respective identities of entities (e.g., people and/or organizations), whereby the binding may be performed through a process of registration and issuance of certificates (e.g., by a certificate authority (CA) of the PKI). Accordingly, a distributed trust chain of a PKI may be utilized to verify the identity of other entities involved in transmitting and/or receiving sensitive data. In another example, a centralized Key Management System (KMS) may control access to cryptographic keys and ensure that only authorized entities have the ability to access those keys. However, in the absence of authorized entities such as a distributed trust chain (e.g., a PKI) and/or a centralized KMS, it may be difficult for endpoints to support attested end-to-end encryption for transporting sensitive data between the endpoints.

BRIEF SUMMARY

Techniques are provided for enabling an autonomous mechanism to provide attested, end-to-end encryption for transporting sensitive data between endpoints.

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, in a secure environment of a data transfer application, a policy profile from a data transfer service, including: (1) an origination key and (2) a destination key, the destination key corresponding to a public transfer key of a storage server that is associated with a transfer of particular sensitive data from the data transfer application to the storage server. The method also includes verifying, by the data transfer application in the secure environment, the policy profile based at least in part on determining that the origination key corresponds to a public transfer key of the data transfer application. The method also includes generating, by the data transfer application in the secure environment, a data encryption key. The method also includes sealing, by the data transfer application in the secure environment, the data encryption key based at least in part on a characteristic of the secure environment. The method also includes encrypting, by the data transfer application in the secure environment, the sealed data encryption key with the public transfer key of the storage server to form an encrypted data encryption key. The method also includes signing, by the data transfer application in the secure environment, the encrypted data encryption key with a private attestation identity key previously generated by the data transfer application in the secure environment, the private attestation identity key attesting to an identity of the data transfer application. The method also includes encrypting, by the data transfer application in the secure environment, the particular sensitive data with the sealed data encryption key to form encrypted data. The method also includes transmitting, by the data transfer application, the signed encrypted data encryption key to the storage server. The method also includes transmitting, by the data transfer application, the encrypted data to the storage server for subsequent decryption of the encrypted data. Other embodiments of this aspect include corresponding computer systems, apparatus, and computer programs recorded on one or more computer storage devices, each configured to perform the actions of the methods.

One general aspect includes an origination device. The origination device also includes a memory may include computer-executable instructions. The device also includes one or more processors in communication with the memory and configured to access the memory and execute the computer-executable instructions to perform, at least. The device also includes receiving, in a secure environment, a policy profile from a data transfer service, including: (1) an origination key and (2) a destination key, the destination key corresponding to a public transfer key of a destination device that is associated with a transfer of particular sensitive data from the origination device to the destination device. The device also includes verifying, in the secure environment, the policy profile based at least in part on determining that the origination key corresponds to a public transfer key of the origination device. The device also includes generating, in the secure environment, a data encryption key. The device also includes sealing, in the secure environment, the data encryption key based at least in part on a characteristic of the secure environment. The device also includes encrypting, in the secure environment, the sealed data encryption key with the public transfer key of the destination device to form an encrypted data encryption key. The device also includes signing, in the secure environment, the encrypted data encryption key with a private attestation identity key previously generated by the origination device in the secure environment, the private attestation identity key attesting to an identity of the origination device. The device also includes encrypting, in the secure environment, the particular sensitive data with the sealed data encryption key to form encrypted data. The device also includes transmitting the signed encrypted data encryption key to the destination device. The device also includes transmitting the encrypted data to the destination device for subsequent decryption of the encrypted data. Other embodiments of this aspect include corresponding computer systems, apparatus, and computer programs recorded on one or more computer storage devices, each configured to perform the actions of the methods.

One general aspect includes one or more non-transitory computer-readable storage media may include computer-executable instructions that. The one or more non-transitory computer-readable storage media also includes receiving, in a secure environment of the origination device, a policy profile from a data transfer service, including: (1) an origination key and (2) a destination key, the destination key corresponding to a public transfer key of a destination device that is associated with a transfer of particular sensitive data from the origination device to the destination device. The media also includes verifying in the secure environment, the policy profile based at least in part on determining that the origination key corresponds to a public transfer key of the origination device. The media also includes generating, in the secure environment, a data encryption key. The media also includes sealing, in the secure environment, the data encryption key based at least in part on a characteristic of the secure environment. The media also includes encrypting, in the secure environment, the sealed data encryption key with the public transfer key of the destination device to form an encrypted data encryption key. The media also includes signing, in the secure environment, the encrypted data encryption key with a private attestation identity key previously generated by the origination device in the secure environment, the private attestation identity key attesting to an identity of the origination device. The media also includes encrypting, in the secure environment, the particular sensitive data with the sealed data encryption key to form encrypted data. The media also includes transmitting the signed encrypted data encryption key to the destination device. The media also includes transmitting the encrypted data to the destination device for subsequent decryption of the encrypted data. Other embodiments of this aspect include corresponding computer systems, apparatus, and computer programs recorded on one or more computer storage devices, each configured to perform the actions of the methods.

DETAILED DESCRIPTION

Figure 1:
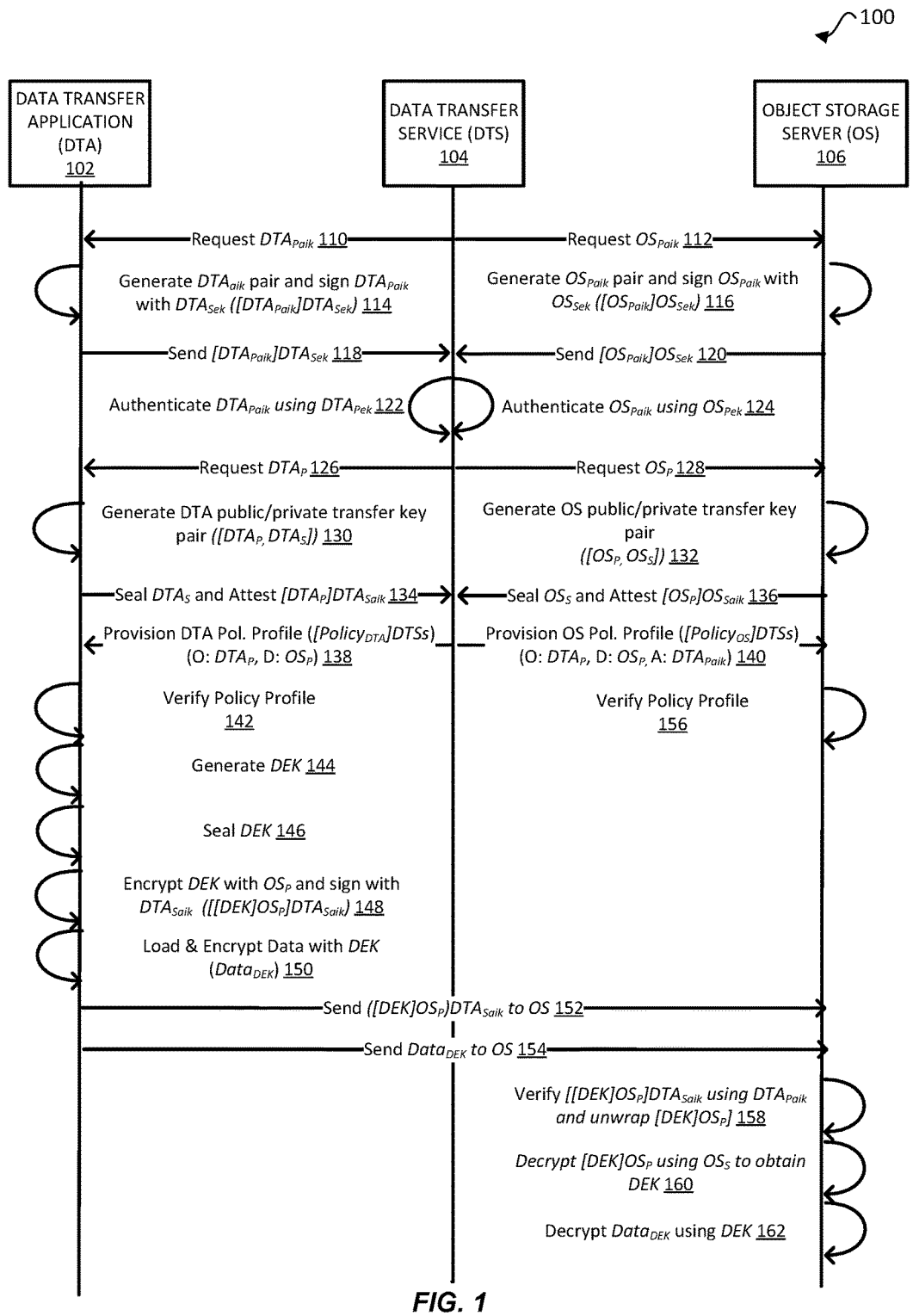
FIG. 1 is a simplified flow diagram illustrating a message exchange process used to enable attested, end-to-end encryption between endpoints, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for enabling an autonomous mechanism that provides attested, end-to-end encryption for transporting sensitive data between endpoints. For example, consider a scenario involving two endpoint devices (e.g., an origination device and a destination device), whereby each computing device provides a secure environment (e.g., a trusted platform environment enabled via a Trusted Platform Module (TPM)). The origination computing device may be on-premises at a customer location (e.g., provisioned to the customer) and contains (e.g., and/or has access to) sensitive data (e.g., customer records). The origination device may be equipped to generate a data encryption key (DEK) for encrypting the sensitive data, encrypt the DEK using a known public key of the destination computing device (i.e., the destination endpoint), and then to provide machine-level attestation of the encrypted DEK based on the TPM of the origination device. The origination device may then encrypt the sensitive data with the DEK to obtain encrypted data, and then transmit both the encrypted data and the encrypted DEK to the destination device.

Meanwhile, in this example, the destination device may be a storage server that is enabled to receive both the encrypted data and the encrypted DEK from the first computing device, verify the attestation of the encrypted DEK (i.e., attested to be generated by the origination device), decrypt the encrypted DEK to obtain the DEK, and then utilize the DEK to decrypt the encrypted data to obtain the sensitive data. The destination device may then store/upload the sensitive data on behalf of the customer. In this way, techniques may enable an autonomous mechanism for providing attested end-to-end encryption between the endpoints, even in the absence of authorized entities such as a PKI (e.g., public Internet PKI or private PKI) or KMS.

In an illustrative example, consider a scenario in which a cloud storage service provider provides a cloud computing service (e.g., infrastructure as a service (IaaS)) for customers to transfer large amounts of data (e.g., sensitive/confidential data) from a customer's on-premise infrastructure storage to the public cloud. For example, in some cases, the amount of data being transferred may exceed a threshold, whereby it is more efficient and/or less error-prone to physically transfer an origination device (a computing device containing the data) from the customer's on-premise infrastructure (an origination endpoint) to the premises of the cloud storage service provider (a destination endpoint). Once the origination device reaches the premises of the cloud storage service provider, the data may be transferred (e.g., via a high-speed data bus) to a destination device of the service provider, whereby the destination device may subsequently upload the data to the public cloud via a high-speed network connection. This may be more efficient and less error-prone than, for example, transmitting the data from the customer's on-premise infrastructure directly to the cloud over the Internet (or other suitable network), where available network resources may constrained and/or subject to packet loss/corruption. Accordingly, in one example, a package delivery service provider may be employed to physically transfer the machine between endpoints. In this example, it should be understood that this method of transferring data may employ an unsecured communications channel. For example, it is possible that an unauthorized party may be able to intercept and/or tamper with sensitive data while in transit.

Continuing with the above illustration, and, to facilitate a process for securely transferring the sensitive data over the unsecured communications channel, the service provider may provide an origination computing device (which may be known herein as a "data transfer application," "data transfer appliance," or "DTA") to the customer, whereby the DTA is provisioned with a TPM and is configured to utilize the TPM to provide a secure environment (e.g., a trusted environment for performing one or more operations). For example, the TPM may be used to measure particular software and platform components (e.g., hardware components) of the DTA, whereby successful measurements may be used by a party to verify that the operating system of the DTA has been securely booted and may be trusted (e.g., has not been tampered with). The TPM may be also be used to attest to the authenticity (e.g., identity) of the DTA, generate and/or store keys, and/or other perform other suitable TPM functions, as described further herein. In some embodiments, the secure environment may be associated with one or more privilege levels. For example, in one privilege level (e.g., "Locality 2" of Intel's Trusted Execution Technology, as described further herein), only trusted system software may access the TPM, for example, to perform one or more of operations of the embodiments described herein. After operations requiring the elevated privilege levels of Locality 2 have been completed, the system may switch to a different privilege level (e.g., "Locality 0"), whereby general access (e.g., by users) may be enabled. In this way, embodiments may restrict access to sensitive cryptographic data (e.g., cryptographic keys), provide remote attestation, and ensure that embodiments are performed on a trusted platform (e.g., a secure environment).

The DTA may perform a series of steps to encrypt the sensitive data for subsequent transmission to the second endpoint (e.g., the destination device). In some embodiments, this series of steps may be performed in a "data encryption phase" that follows an initial "setup phase," described further herein. For example, this series of steps of the data encryption phase may include, among other steps, receiving from a trusted third-party data transfer service (DTS) a policy profile, verifying the policy profile, generating a DEK (e.g., a symmetric key) for encrypting the sensitive data, encrypting the DEK with a known public key of a storage server the service provider (e.g., provided in the policy profile), signing the encrypted DEK with a previously generated private attestation identity key (AIK), loading the sensitive data onto the DTA, and then using the DEK to encrypt the sensitive data to obtain encrypted data. One or more of the steps of the data encryption phase may be performed within the secure environment and/or utilize the TPM, for example, including utilizing the TPM of the secure environment to sign the encrypted DEK with the private AIK. In this way, the second endpoint (e.g., the destination device) may verify the authenticity of the DEK (e.g., as coming from the correct DTA) based in part on relying on the TPM-rooted signature of the DEK. Upon completing the data encryption phase (e.g., completing steps to prepare the signed and encrypted DEK as well as to generate the encrypted data), the DTA may be transferred to the second endpoint.

Upon the service provider receiving the DTA, the destination device (e.g., a storage server) of the service provider may then proceed to perform a "data decryption phase." In this illustration, the storage server (which may be known herein as an "object storage server" or "OS") of the service provider may be a computing device that is determined (e.g., by the third-party DTS) to receive, decrypt, and process (e.g., upload to the cloud) the particular sensitive data received from the DTA. In some embodiments, and, similar to as described above with respect to the DTA, the OS may be provisioned with a TPM and utilize the TPM to provide a secure environment. Accordingly, one or more steps of the data decryption phase may be performed within the secure environment of the OS. The OS may perform the data decryption phase subsequent to a setup phase (performed with respect to the OS and the third-party DTS), described further below. In some embodiments, the data decryption phase may include including booting the DTA to a secure environment by utilizing the TPM of the DTA, to ensure that the operating system executing on the DTA may be considered trusted (e.g., that the DTA was not tampered with, while in transit). Upon the DTA being booted to the secure environment, the encrypted data and the encrypted DEK may be transferred to the storage server of the service provider. In some embodiments, the data decryption phase may also include verifying a policy profile received from the DTS, which may be a similar verification process as performed by the DTA. Upon the OS verifying the policy profile and receiving the signed and encrypted DEK from the booted DTA, the OS may then verify the authenticity (e.g., by verifying the signature) of the DEK via a public AIK that is a counterpart of the private AIK with which the encrypted DEK was signed. In some embodiments, the public AIK may have been previously received by the OS within the policy profile from the DTS. Upon verifying the authenticity of the signed (and encrypted) DEK, the OS may then decrypt the encrypted DEK to obtain the DEK. After obtaining the DEK, the OS may decrypt the encrypted data received from the DTA to obtain the sensitive data, thus concluding the data decryption phase. In some embodiments, the OS may subsequently upload the sensitive data to the public cloud via a faster uplink channel (e.g., faster than the customer's on-premise uplink channel).

In some embodiments, as introduced above, the third party device (referred to herein as the "data transfer service" or "DTS") may be utilized to facilitate (e.g., as a trusted intermediary) transferring sensitive data from the origination device (e.g., the DTA) to the destination device (e.g., the OS) by coordinating respective setup (or "initiation") phases for both devices (e.g., the DTA and the OS). For example, in some embodiments, the DTS may initially request that the DTA and the OS, respectively, generate a pair of transfer keys (e.g., asymmetric ephemeral public/private keys) for the particular sensitive data being transferred. In some embodiments, while these transfer keys are utilizable for the particular sensitive data being transferred, they may not be utilizable for other sensitive data being transferred (e.g., based in part on being ephemeral keys). Upon generating the transfer key pairs, the DTA and OS may, respectively, transmit the public transfer key of the transfer key pair to the DTS. In some embodiments, each party may also seal their respective private transfer key and sign their respective public transfer key with their private AIK. In some embodiments, as described further herein, both the DTA and the OS may have, respectively, previously generated an AIK pair and transmitted the public key of the AIK pair to the DTS, whereby the DTA authenticates and stores the respective AIK public key of each device. Accordingly, upon the DTS receiving the public transfer key from each party for the particular data transfer, the DTS may verify the signature of each public transfer key by using the respective AIK public key that was previously stored. In some embodiments, instead of the DTA and OS themselves, respectively, generating a transfer key pair for the particular sensitive data being transferred, the DTS may instead generate and provision transfer key pairs to both the DTA and the OS. In any case, in some embodiments, during the setup phase and prior to the commencement of a data encryption phase (e.g., for the DTA) and/or a data decryption phase (e.g., for the OS), the DTS may first obtain (e.g., generate or receive) the public transfer key for the particular sensitive data transfer from the respective DTA and OS devices.

In some embodiments, to complete the setup phase, and, as introduced above, the DTS may transmit a policy file (a "policy profile"), respectively, to the DTA and the OS devices. For example, with respect to the setup phase of the DTA, the DTS may generate a first policy file that includes the public transfer key of the DTA (e.g., previously received from and attested by the DTA, as described above). This public transfer key of the DTA may also be described herein as an "origination key," since the origination point of the particular sensitive data transfer is the DTA device. The DTS may also include in the first policy file the public transfer key of the OS that was also previously received by the DTS from the OS (also having been attested by the OS). The public transfer key of the OS may also be described herein as a "destination key," since the destination point of the particular data transfer is the OS device. The DTS may then transfer the first policy file to the DTA. Similarly, with respect to the setup phase of the OS, the DTS may generate a second policy file that includes the origination key and the destination key, based on keys previous received by the DTS from the respective devices (as discussed above). In some embodiments, the DTS may also include in the second policy file a public AIK of the DTA. The DTS may then transfer the second policy file to the OS.

Upon the completion of the setup phase, respectively, by the DTA and the OS devices, the DTA may proceed with the data encryption phase and the OS may proceed with the data decryption phase. For example, the DTA may receive the first policy file and verify that the first policy file is correct (e.g., that it matches the particular data transfer) based in part on confirming that the origination key in the first policy file corresponds to the previously generated public transfer key of the DTA. Upon the DTA verifying the first policy file, the DTA may proceed with subsequent steps of the data encryption phase, as described above. For example, the DTA may generate the DEK, seal the DEK, encrypt the DEK using the public transfer key of the OS (e.g., received in the first policy file), etc.

Similarly, the OS may proceed with the data decryption phase by first receiving the second policy file and then verifying that the second policy file is correct based on confirming that the destination key in the second policy file corresponds to the previously generated public transfer key of the OS. Upon verifying the second policy file, and, subsequently receiving the signed and encrypted DEK from the DTA (e.g., as described above), the OS may verify the signature of the encrypted DEK by utilizing the public AIK of the DTA previously received in the second policy file (e.g., that corresponds to the private AIK used (by the DTA) to sign the encrypted DTA). The OS may then proceed to decrypt the DEK and then utilize DEK to decrypt the encrypted data for subsequent storage in the cloud, as described above. It should be understood that any suitable period of time (e.g., gap) may exist between one or more steps of the data decryption phase that is performed by the OS. For example, a time gap (e.g., second, minutes, days, weeks, etc.) may exist between the time that the OS receives the second policy file and the time that the OS receives the encrypted DEK and/or encrypted data. Also, as described further herein, any suitable time gap may exist between the time the OS receives the encrypted DEK and the time that the OS receives the encrypted data.

For clarity of illustration, embodiments described herein may primarily depict a DTA (e.g., a computing device) that contains encrypted data and/or an encrypted DEK as being physically transported (e.g., via a package delivery service) to the second endpoint (e.g., a service provider). Upon reaching the service provider, the encrypted data and encrypted DEK may be transferred from the DTA to an object storage server (OS) of the service provider, for subsequent decryption of the encrypted data and upload to the cloud. However, embodiments should not be construed to be so limited. For example, embodiments, may be performed using any suitable communications channel (e.g., a public and/or private network connection). In one example, after performing one or more steps of the data encryption phase, the DTA (e.g., booted to the secure environment) may sign the encrypted DEK utilizing the TPM within the secure environment. The DTA may then transmit the signed and encrypted DEK over the Internet to the OS, whereby the OS subsequently performs the data decryption phase. The DTA may also transmit the encrypted data over the network to the OS. As described above, in some embodiments, there may be a time gap between the transmission of the encrypted DEK and the encrypted data. Furthermore, in some embodiments, the ordering of transmitting the encrypted DEK and/or the encrypted data may vary. In one example, the encrypted data may be transmitted first to the OS, whereby the OS stores the encrypted data for later decryption. At a later time, the DTA may send the signed and encrypted DEK to the OS. The OS may then retrieve the DEK and also retrieve the previously stored encrypted data for subsequent decryption of the encrypted data using the DEK. It should also be understood that, although embodiments described herein primarily refer to the origination device as a DTA and the destination device as an OS, embodiments should not be construed to be so limited. For example, embodiments, may be performed using any suitable origination computing device to transmit sensitive data to any suitable destination computing device over a communications channel (e.g., a untrusted network, an untrusted package delivery service, etc.).

The embodiments of the present disclosure provide several technical advantages over existing systems. In one example, embodiments of the present disclosure may reduce (e.g., obviate) reliance on having a centralized KMS, PKI, and/or a trusted key escrow party to facilitate the sensitive data transfer. This may significantly reduce resource utilization, for example, eliminating the need for a centralized system (e.g., a certificate authority, a key management server) to manage keys, enabling authenticated key exchange with a minimal set of API calls, and/or facilitate a secure exchange of data between parties in an authenticated manner. Embodiments described herein achieve this improvement in part by utilizing a TPM that resides in a secure environment on both devices (e.g., the origination device and destination devices). The TPM warrants measured and secure launching of these respective devices (e.g., a DTA and an OS) that are also mutually authenticated prior to exchanging confidential data (e.g., via a secure boot process, the use of policy file verification, etc.). This autonomous mechanism, rooted in the hardware (e.g., the secure environment that includes the TPM), is autonomous in the sense that no manual intervention is needed to transport keys (e.g., DEKs) or sensitive data between authenticated endpoints. This automation increases security (e.g., reducing a possibility of manual error) and reduces cost of system maintenance. In some embodiments, a trusted third-party (e.g., a DTS) may be utilized to provision keys and/or policy profiles to the different endpoint devices. Once the endpoints are provisioned (e.g., during the respective setup phases), no manual intervention may be required to facilitate the transfer of encrypted sensitive data between the two devices. In another advantage, embodiments enable forward secrecy and guarantee freshness with each new transfer of sensitive data. For example, by using ephemeral keys to wrap (e.g., encrypt) the DEK, even if one of the keys is compromised, other data transfers of other particular sensitive data (e.g., using other sets of ephemeral keys) may still be protected. Also, this mechanism guarantees freshness by protecting against replay attacks. In another advantage, whereas some industry solutions may require network level encryption capabilities (e.g., over a communications channel), private peering gateways, and/or additional key storage facilities, embodiments of the present disclosure do not require these capabilities to be present. In yet another advantage, sensitive data being communicate between the two endpoint devices may be only exposed in plain text on those two devices (e.g., being loaded onto the origination device, and being unloaded onto the destination device). Furthermore, in some embodiments, only these two systems may obtain access to the DEK used to encrypt the sensitive data within their respective secure environments.

FIG. 1 shows a diagram 100 depicting a message exchange process used to enable attested, end-to-end encryption between endpoints, according to some embodiments. In diagram 100, three devices are depicted, including a DTA 102, a DTS 104, and an OS 106. As described herein, it should be understood that any suitable computing device may be utilized to perform the functions of each of these devices. For example, a server computer or a personal computer (PC) may be employed.

In some embodiments, the DTA 102 and the OS 106 may, respectively, include a TPM. For example, the TPM may include a secure cryptoprocessor that secures hardware through integrated cryptographic keys, and the TPM may be physically connected to (e.g., attached, or otherwise co-located with) a motherboard of a device. In some embodiments, one or more features of the TPM may substantially conform to a specification provided by the Trusted Computing Group (TCG) and standardized by the International Organization for Standardization (ISO). In some embodiments, one or more cryptographic keys stored on the TPM (e.g., an endorsement key, a storage root key) may enable a device (e.g., an origination device) to provide remote attestation to another device (e.g., a destination device). For example, as described herein, an attestation identity key (AIK), among other potential cryptographic keys, may be generated based at least in part on the TPM. The AIK may enable the destination device to verify an identity of the origination device.

In some embodiments, the TPM may also be utilized to execute a function(s) that measures the integrity of a platform. For example, a device may utilize the TPM and one or more cryptographic techniques to verify that an operating system of the device starts (e.g., boots) in a trusted (e.g., secure) environment. In some embodiments, the cryptographic techniques may include providing measurements of particular software and/or particular platform components (e.g., hardware components) associated with the particular device. Accordingly, if an unauthorized user attempts to remove a component (e.g., a hard disk) from the device and/or access/modify data on the device (e.g., while the device (e.g., the DTA) is in transit) without performing the secure boot process, the unauthorized user may be prevented from accessing/modifying the data. For example, the unauthorized user may be prevented from accessing and/or manipulating cryptographic keys previously generated by the device. Upon securely booting the device to the secure environment, applications may thereby be executed within the secure environment in a secure fashion. In some embodiments, the TPM and/or cryptographic techniques (e.g., functions) used to provide the secure environment may be enabled by any suitable technology, including, but not limited to, Intel Trusted Execution Technology ("Intel TXT") or AMD Secure Technology (e.g., utilizing an "SKINIT" instruction to securely boot a device).

In some embodiments, for example, in the case of a device executing the Intel TXT, the secure environment may be associated with one or more privilege levels. For example, as described above, the Locality 2 of Intel TXT may correspond to an elevated privilege level, whereby system software may executed in a secure mode, and the Locality 0 may be associated with a lower privilege level, enabling general access by users. In some embodiments, one or more of the operations described herein may be performed at an elevated privilege level (e.g., within Locality 2) of the secure environment. For example, one or more of the cryptographic keys generated and/or utilized as described with respect to operations of FIG. 1 (e.g., with respect to the DTA 102 and/or the OS 106) may not be accessible to users in memory. For example, one or more keys may be stored (e.g., embedded) in the TPM and/or derived from one of the keys in the TPM, and may only be accessible via an elevated privilege level (e.g., Locality 2 of the Intel TXT). Accordingly, one or more of the operations described with respect to the respective setup phases, data encryption phase (of the DTA 102), and/or the data decryption phase (of the OS 106) may be performed at an elevated privilege level associated with the secure environment of the device. In this way, embodiments may restrict access to sensitive cryptographic data (e.g., cryptographic keys), even by users of either device (e.g., DTA 102, OS 106). After the one or more secure operations needed to encrypt sensitive data and/or keys (e.g., the DEK) has been completed, the device (e.g., DTA 102) may switch to a lower privilege level (e.g., Locality 0), enabling general access by users.

In some embodiments, the DTS 104 may be a computing device (e.g., a server device) that is responsible for coordinating an initial setup phase between both the DTA 102 and the OS 106. During this setup phase, as described further herein, one or more keys (e.g., transfer key pairs) may be provisioned to each device for use in transferring the particular sensitive data (e.g., among other sensitive data) from the DTA 102 to the OS 106. As depicted in FIG. 1, the setup phases (e.g., between the DTA 102 and the DTS 104, and the OS 106 and the DTS 104) are performed between steps 110-140. In FIG. 1, the setup phase is performed whereby both the DTA 102 and the OS 106, respectively, generate their own transfer key pairs, and then transmit respective public transfer keys to the DTS 104. However, embodiments should not be construed to be so limiting. For example, the DTS 104 may generate respective transfer key pairs for both the DTA 102 and the OS 106, and then provision the respective transfer key pairs to each device during the set up phase. In some embodiments, one or more of the steps of the setup phase between the DTA 102 and the DTS 104 may be performed in parallel (or serially) with respect to one or more steps of the setup phase between the OS 106 and the DTS 104. Accordingly, although, as depicted in FIG. 1, similar steps of the setup phase between each device at the DTS 104 are performed in lockstep, embodiments should not be construed to be so limiting. In any case, following the setup phase respectively performed by the DTA 102 and the OS 106 (e.g., collectively, depicted by steps 110-140), the DTA 102 may perform a data encryption phase and the OS 106 may perform a corresponding data decryption phase. These two phases are collectively depicted by steps 142-162 of FIG. 1.

In some embodiments, the DTS 104 may initially store (e.g., maintain) one or more settings, which may be used to perform embodiments described herein. For example, the DTS 104 may store a mapping between a particular endorsement key (EK) (e.g., a public EK) and a particular TPM of a particular device (e.g., the DTA 102 and/or the OS 106). Note that, in some embodiments, a private EK (corresponding to the public EK) may be stored (e.g., embedded) within the TPM on a device. Also, in some embodiments, a public key of the DTS 104 (e.g., $DTS_P$) may be stored, respectively, on the DTA 102 and the OS 106. For example, the public key of the DTS 104 may be embedded in a boot binary of the OS 106 and the DTA 102. In some embodiments, the public key of the DTS 104 may be rotated by updating the binaries.

Turning to the message exchange process of FIG. 1 in further detail, at 110, the DTA 102 may receive a request from the DTS 104 for a public AIK associated with the DTA 102. Similarly, at 112, the OS 106 may receive a request from the DTS 104 for a public AIK associated with the OS 106.

At 114, the DTA 102 may generate a pair of AIKs, including a public AIK (e.g., represented in FIG. 1 as $DTA_{Paik}$) and a corresponding private (e.g., secret) AIK (e.g., represented in FIG. 1 as $DTA_{Saik}$). In some embodiments, each of the AIKs may be ephemeral keys, whereby a new pair of ephemeral cryptographic keys may be generated for each execution of a key establishment process. For example, if at a later time, another particular sensitive data were to be transferred from the DTA 102 to the OS 106 (or another destination device), a new pair of ephemeral cryptographic keys may be utilized for the transmission (e.g., encryption) of that other particular sensitive data. In some embodiments, an AIK may not be an ephemeral key. In some embodiments, an AIK (and/or one or more other public/private keys described herein) may be generated based on RSA (Rivest-Shamir-Adleman) encryption techniques. In some embodiments, the pair of AIKs may be generated based at least in part on the TPM (e.g., generated from one of the TPM keys of the DTA 102). In some embodiments, the DTA 102 may sign the public AIK of the DTA 102 with a private (i.e., secret) EK of the DTA 102 (e.g., represented as $DTA_{Sek}$). Accordingly, the signed public AIK may be represented in diagram 100 as $[DTA_{Paik}]OTA_{Sek}$. In some embodiments, as described above, the private EK may be stored in the TPM of DTA 102.

At 116, and, similar to 114, the OS 106 may generate a pair of AIKs, including a public AIK ($OS_{Paik}$) and a corresponding private AIK ($OS_{Saik}$). In some embodiments, OS 106 may sign the public AIK of the OS 106 with a private EK ($OS_{Sek}$) of the OS 106. Accordingly, the signed public AIK may be represented in diagram 100 as $[OS_{Paik}]OS_{Sek}$.

At 118, the DTA 102 may transmit the signed public AIK of the DTA 102 to the DTS 104. At 120, the OS 106 may transmit the signed public AIK of the OS 106 to the DTS 104.

At 122, the DTS 104 may authenticate the signed public AIK of the DTA 102 (e.g., verify the signature) using the public EK of the DTA. Similarly, at 124, the DTS 104 may authenticate the public AIK of the OS 106 using the public EK of the OS. Note that, as described above, the DTS 104 may have previously stored the public EK of both the DTA 102 and the OS 106.

At 126, the DTA 102 may receive a request from the DTS 104 for a public transfer key of the DTA 102. As described herein, the public transfer key of the DTA 102 ($DTA_P$) may be associated with the transfer of particular sensitive data from the DTA 102 to the OS 106. Similarly, at 128, the OS 106 may receive a request from the DTS 104 for a public transfer key of the OS 106. Also, the public transfer key of the OS 106 ($OS_P$) may also be associated with the same transfer of the particular sensitive data from the DTA 102 to the OS 106.

At 130, the DTA 102 may generate a pair of transfer keys ($[DTA_P, DTA_S]$), which may correspond to public and private cryptographic keys. In some embodiments, the transfer keys may be ephemeral keys. Similarly, at 132, the OS 106 may generate a pair of transfer keys ($[OS_P, OS_S]$).

At 134, the DTA 102 may sign the pubic transfer key of the DTA 102 with the private AIK of the DTA 102 (e.g., represented as $[DTA_P]DTA_{Saik}$), thereby attesting that the public transfer key ($DTA_P$) is the actual public transfer key associated with DTA 102. In some embodiments, at 134, the DTA 102 may also seal the private transfer key of the DTA 102, whereby, sealing the private transfer key may correspond to cryptographically binding the private transfer key to the DTA 102 device (e.g., utilizing the TPM of the DTA 102) based on a characteristic of the secure environment of the DTA 102. For example, the characteristic may correspond to the particular software and/or particular platform (e.g., hardware) components associated with the DTA 102. In some embodiments, by sealing the private transfer key, the private transfer key may only be later recovered if the DTA 102 is booted to the secure environment (e.g., in a known and trusted state).

Similarly, at 136, the OS 106 may sign the public transfer key of the OS 106 with the private AIK of the OS 106 (e.g., represented as $[OS_P]OS_{Saik}$), thereby attesting that the public transfer key ($OS_P$) is the actual public transfer key associated with OS 106. In some embodiments, at 136, the OS 106 may also seal the private transfer key of the OS 106.

At 138, the DTS 104 may transmit a policy profile (e.g., $Policy_{DTA}$) to the DTA 102. In some embodiments, the policy profile may be signed by a private key of the DTS 104 (e.g., $DTS_S$), whereby the signed policy profile may be represented as $[Policy_{DTA}]DTS_S$. Similarly, at 140, the DTS 104 may transmit a policy profile (e.g., $Policy_{OS}$) to the OS 106. In some embodiments, the policy profile may also be signed by the private key of the DTS 104 (e.g., $DTS_S$), whereby the signed policy profile for the OS 106 may be represented as $[Policy_{OS}]DTS_S$. As described herein, a policy profile (e.g., policy file) may be used by the DTS 104 to communicate to each endpoint device (e.g., DTA 102, OS 106) who they should be communicating with regarding the particular transfer of sensitive data. In some embodiments, the DTS 104 may determine which endpoint devices should be paired together (e.g., as an origination and/or destination device) based on any suitable mechanism. For example, the DTS 104 may receive input from an administrator, or programmatically determine which devices should be paired together based on determining schedule and/or resource availability.

In some embodiments, the policy profile sent to the DTA 102 may contain at least: (1) an origination key (represented as "O: $DTA_P$" in FIG. 1), and (2) a destination key (represented as "D: $OS_P$" in FIG. 1). Assuming that the DTS 104 sends the correct policy profile to the DTA 102, the origination key may correspond to the public transfer key of the DTA 102 (i.e., which, in this illustration, is the origination device). Also, the destination key may correspond to the public transfer key of the OS 106 device (i.e., which, in this illustration, is the destination device). In some embodiments, the policy profile sent to the OS 106 may be similar to the one sent to the DTA 102. In some embodiments, the policy profile sent to the OS 106 may also include the public AIK of the DTA 102 (represented as "A: $DTA_{Paik}$" in FIG. 1). The public AIK of the DTA 102 may be later used (e.g., at 158) to verify a signature of the encrypted DEK.

In some embodiments, as described above, 138 and 140, respectively, may conclude a setup phase, whereby both the DTA 102 and the OS 106 are provisioned with the transfer keys for the particular transfer of sensitive data. Also, in this setup phase, both devices have respectively received instructions (i.e., policy profiles) so that each device knows who is the counterpart endpoint device for the particular transfer. Note that, although in this illustration each device (e.g., DTA 102 and OS 106) generated their own respective pairs of transfer keys, in another embodiment, the DTS 104 (or any suitable trusted third party) may have generated and provisioned appropriate transfer keys to the respective parties during the setup phase.

Turning to the data encryption phase performed by the DTA 102, at 142, the DTA 102 may receive the signed policy profile ($[Policy_{DTA}]DTS_S$) from the DTS 104 (e.g., and/or retrieve a previously received policy profile) and then verify the policy profile. In some embodiments, the DTA 102 may verify the signature of the policy profile using the public key ($DTS_P$) of the DTS 104. After verifying the signature of the policy profile, the DTA 102 may verify the policy profile based on determining that the origination key within the policy profile matches the public transfer key of the DTA 102. This verification process may provide confirmation for the DTA 102 that the destination device associated with the destination key in the policy profile (e.g., OS 106, associated with $OS_P$) is the correct destination device for the particular transfer. It should be understood that, in some embodiments, 142 (and any one or more operations of the data encryption phase) may be performed by the DTA 102 within a secure environment and/or at an elevated privilege level of the secure environment.

At 144, the DTA 102 may generate a data encryption key (DEK). In some embodiments, the DEK may be a symmetric encryption key. In some embodiments, the DEK may be encrypted using the Advanced Encryption Standard (AES) using a key length of 256 bits (e.g., AES 256). It should be understood that, any suitable cryptographic technique may be used to generate the DEK.

At 146, the DTA 102 may seal the DEK. In some embodiments, similar to as described above with reference to the sealing the private transfer key of the DTA 102, sealing the DEK may cryptographically bind the DEK to the DTA 102 device utilizing the TPM.

At 148, the DTA 102 may encrypt (e.g., wrap) the DEK with the public transfer key of the OS 106, which the DTA 102 previously received within the policy profile at 138. The DTA 102 may also sign the wrapped DEK with the private AIK of the DTA 102. Accordingly, as depicted in FIG. 1, the signed and encrypted DEK may be represented as $[[DEK]OS_P]DTA_{Saik}$. In some embodiments, the DTA 102 may use any suitable cryptographic technique to generate the signed encrypted DEK. For example, the DTA 102 may use a nonce and/or a timestamp, to ensure that previous communications cannot be reused in replay attacks.

At 150, the DTA 102 may load the sensitive data (e.g., from a disk drive, or any suitable source) onto the DTA 102, and then encrypt the sensitive DTA using the DEK, thus forming encrypted data (which may be represented as $Data_{DEK}$ in FIG. 1). In some embodiments, following the operations of 150, the data encryption phase performed by the DTA 102 may be completed.

At 152, the DTA 102 may transmit the signed encrypted data encryption key ($[[DEK]OS_P]DTA_{Saik}$) to be received by the OS 106.

At 154, the DTA 102 may also transmit the encrypted data ($Data_{DEK}$) to be received by the OS 106. As described herein, it should be understood that the operations of 152 and 154 may be occur in a different order from that depicted in FIG. 1 (e.g., the encrypted data may be transmitted immediately after 150, before transmitting the signed and encrypted DEK). Also, as described herein, in some embodiments, following step 150, the DTA 102 may be powered down and physically transported to an endpoint location that contains the OS 106 device. In some embodiments, the encrypted data and/or signed encrypted DEK may be transmitted over a suitable network (e.g., the Internet) to the OS 106. In some embodiments, any suitable gap of time may exist between the time the encrypted data is transmitted (e.g., and/or transported) and the time the signed encrypted DEK is transmitted. (e.g., and/or transported).

Turning to the data decryption phase performed by the OS 106, at 156, the OS 106 may receive the signed policy profile ($[Policy_{OS}]DTS_S$) from the DTS 104 and then verify the policy profile. In some embodiments, the OS 106 may first verify the signature of the policy profile using the public key ($DTS_P$) of the DTS 104. In some embodiments, subsequent to verifying the signature of the policy profile, the DTA 102 may verify the policy profile based on determining that the destination key within the policy profile matches the public transfer key of the OS 106. This verification process may provide confirmation for the OS 106 that the origination device associated with the origination key in the policy profile (e.g., DTA 102, associated with $DTA_P$) is the correct origination device. It should be understood that, in some embodiments, 156 (and any one or more operations of the data decryption phase) may be performed by the OS 106 within a secure environment. For example, the booted operating system of OS 106 may be verified to correspond to a secure environment based on utilizing the TPM to perform one or more measurements and/or utilize cryptographic techniques to verify the integrity of the operating system. In some embodiments, the secure environment may correspond to executing with an elevated privilege (e.g., Locality 2), as described herein. Also, it should be understood that one or more of the operations of 156 may be performed at any suitable time, subsequent to receiving the policy profile from the DTS 104. For example, the OS 106 may verify the policy profile after receiving the encrypted data at 154 and/or the signed and encrypted DEK at 152.

At 158, the OS 106 may verify that the signed encrypted DEK originated from the DTA 102. It should be understood that the operations of 158 may happen subsequently to receiving the signed encrypted DEK from the DTA 102. Note that, as described above, once the DTA 102 and the 106 have been provisioned during the respective setup phases (e.g., facilitated by the DTS 104), the devices may perform autonomous attested end-to-end encryption between the two devices, without requiring an intermediary. Upon receiving the signed encrypted DEK, the OS 106 may perform the verification based on determining that the encrypted DEK is signed with a private AIK of the DTA 102 that corresponds to the public AIK of the DTA 102 (e.g., that was received in the policy profile (e.g., at 140)). Accordingly, the OS 106 may unwrap (e.g., decrypt) the signed encrypted DEK to obtain the encrypted DEK by using the public AIK of the DTA 102.

At 160, the OS 106 may decrypt the encrypted DEK (e.g., obtained from 158) using the private transfer key of the OS 106. Note that, as described above, the DEK may be encrypted with the public transfer key of the OS 106 (e.g., previously received by the DTA 102 in the policy profile from the DTS 104), and thus, the corresponding private transfer key of the OS 106 may be used to decrypt the encrypted DEK to obtain the DEK. In some embodiments, the OS 106 may transmit an acknowledgement ("ACK") to the DTA 102 upon obtaining the DEK. In some embodiments, the ACK may be signed by the private transfer key of the OS 106.

At 162, the OS 106 may decrypt the encrypted data using the DEK (e.g., obtained from 160) to obtain the particular sensitive data that was encrypted. It should be understood that the operations of 162 may happen subsequently to receiving the encrypted data from the DTA 102 at 154. Note that, similar to as described above, in some embodiments, any suitable time gap may exist between receiving the signed encrypted DEK and the encrypted data from the DTA 102. Furthermore, in some embodiments, the order in which the data is received may be different (e.g., swapped) from as described in FIG. 1. For example, the OS 106 may receive the encrypted data first, and store the encrypted data in a suitable location. Then, at a later time, the OS 106 may receive the signed encrypted DEK, retrieve the DEK (e.g., as described in 158 and 160), retrieve the stored encrypted data, and then use the DEK to decrypt the encrypted data. Accordingly, any suitable variations of ordering and/or timing of transmitting/receiving data may be performed by embodiments of the present disclosure.

In some embodiments, the particular sensitive data may be transferred by the DTA 102 to the OS 106 via one or more encrypted data units (e.g., data packets). In some embodiments, an ACK may be sent back from the OS 106 to the DTA 102 to acknowledge successful receipt of the data unit. As described above, in some embodiments, any suitable cryptographic technique may be used may be used during the transmission of data units and/or ACKs. For example, a cryptographic nonce (e.g., a random number) and/or timestamp may be used to avoid replay attacks. For example, the cryptographic nonce and/or timestamp may be used as an input to one or more cryptographic functions (e.g., when transmitting a signed encrypted DEK and/or encrypted data by the DTA 102, when transmitting an ACK by the OS 106 to the DTA 102, etc.). In some embodiments, the cryptographic nonce may be used to modify an original data element (e.g., a signed encrypted DEK) to generate another data element (e.g., a "blinded key") that is obfuscated or otherwise modified from its original value. In some embodiments, the cryptographic nonce and/or timestamp may be transmitted alongside the modified data element (e.g., the blinded key), whereby the receiving entity may use the nonce as input to a cryptographic function to recover the original data element (e.g., a signed encrypted DEK). In some embodiments, after the particular sensitive data (e.g., all the corresponding data units of the particular sensitive data) have been transferred to the OS 106, the DTA 102 may send a final packet with any suitable indicator (e.g., the signed encrypted DEK) to indicate the "End of Transfer" (EoT). Upon receiving the EoT packet, the OS 106 may invalidate the DEK and/or other ephemeral keys (e.g., the transfer keys of the OS 106)) that were created for the purpose of transferring the particular sensitive data. The OS 106 may also send a final ACK EoT packet to the DTA 102. Upon receiving the final ACK EoT packet, the DTA 102 may similarly invalidate the DEK and the other ephemeral keys (e.g., the transfer keys of the DTA 102) that were created by the DTA 102.

In some embodiments, after the particular sensitive data has been retrieved by the OS 106 based on the message exchange process of diagram 100, the OS 106 may transmit the particular sensitive data to the public cloud, and/or store the data to any suitable location. As described herein, in some embodiments, the OS 106 may be a computing device that is on-premise to a cloud services provider, and may therefore have a faster uplink connection to the public cloud. In some embodiments, the OS 106 may transmit the particular sensitive data to the public cloud using any suitable technique (e.g., over a Virtual Private Network (VPN) and/or encrypting the data).

Figure 2:
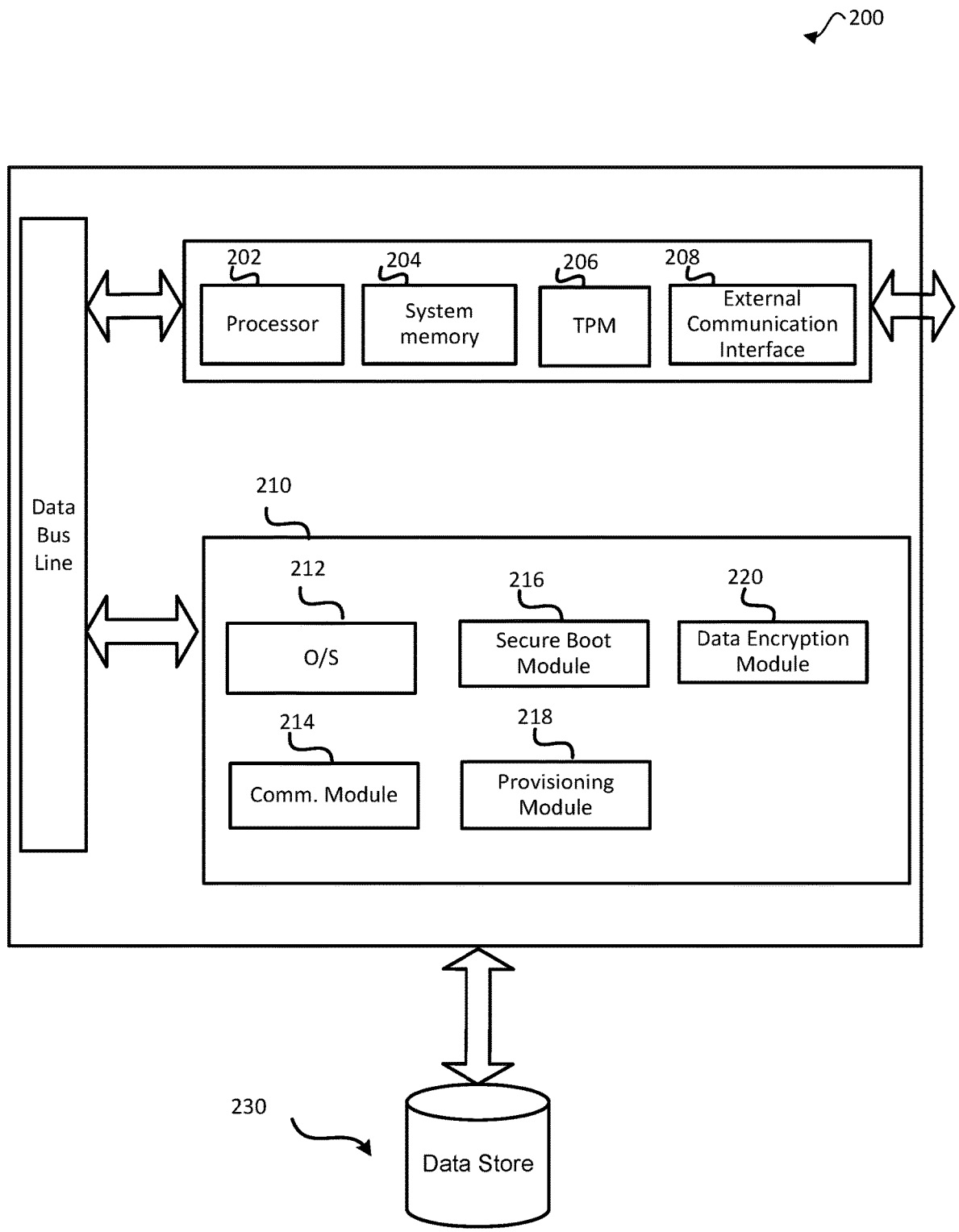
FIG. 2 is a simplified block diagram illustrating an example architecture of an endpoint device used to enable attested, end-to-end encryption between endpoints, according to some embodiments.

FIG. 2 is a simplified block diagram illustrating an example architecture of an endpoint device 200 used to enable attested, end-to-end encryption between endpoints, according to some embodiments. The endpoint device 200 may correspond to an origination device (e.g., a DTA device), which may be similar to DTA 102 of FIG. 1. In some embodiments, the endpoint device 200 may correspond to any suitable computing device, including, for example a server computer, a PC, a mobile device, etc.

The device 200 may include a processor 202, which may be coupled to a system memory 204, a TPM 206, and an external communication interface 208. A computer readable medium 210 may also be operatively coupled to the processor 202. A data store 230 may also be in operative communication with the processor 202. The data store 230 may contain sensitive data, which may be retrieved (e.g., loaded) by the device 200 for use in encrypting the sensitive data.

The computer readable medium 210 may include an operating system 212 and one or more modules for implementing the features disclosed herein, including, a communications module 214, a secure boot module 216, a provisioning module 218, and a data encryption module 220. In some embodiments, the operations performed by one or more of the modules may utilize the TPM 206, as described herein. In some embodiments, the operations performed by one or more of the modules may be executed in a secure environment, whereby the operating system is booted in a trusted environment, and thereby the operating system may be considered trusted. In some embodiments, one or more of the operations may be performed within an elevated privilege level (e.g., Locality 2 of the Intel TXT) of the secure environment.

Turning to specific modules of the computer readable medium 210 in further detail, the communications module 214 may comprise code that causes the processor 202 to generate messages, forward messages, reformat messages, and/or otherwise communicate with other entities. For example, as described herein, the communications module 214 may transmit and/or receive messages from a third party (e.g., a DTS, similar to DTS 104 of FIG. 1) and/or a destination device (e.g., a storage server, similar to OS 106 of FIG. 1). For example, the communications module 214 may transmit encrypted data and/or a signed and encrypted DEK to the destination device (e.g., OS 106). In some embodiments, the communications module 214 may use any suitable communication path or channel such as, for instance, a wire or cable, fiber optics, a telephone line, a cellular link, a radio frequency (RF) link, a WAN or LAN network, the Internet, or any other suitable medium. The network may include any one or a combination of many different types of networks, such as cable networks, the Internet, wireless networks, cellular networks, and other private and/or public networks.

The secure boot module 216 may comprise code that causes the processor 202 to ensure that the device 200 operates in a secure environment. In some embodiments, the secure boot module 216 may utilize one or more cryptographic techniques to verify that the operating system 212 launches (e.g., boots) in a trusted environment. As described herein, in some embodiments, the cryptographic techniques may include providing measurements of particular software and/or particular platform components (e.g., hardware components) associated with the particular device 200 (e.g., the processor 202, the system memory 204, the TPM 206, and/or any other software/hardware components of the device 200). In some embodiments, the secure boot module 216 may utilize the TPM 206 to perform one or more of the cryptographic techniques. In some embodiments, the TPM and/or cryptographic techniques (e.g., functions) used to provide the secure environment may be enabled by any suitable technology, including, but not limited to, Intel TXT or AMD Secure Technology (e.g., utilizing an "SKINIT" instruction to securely boot the device 200).

The provisioning module 218 may comprise code that causes the processor 202 to perform one or more operations of a setup phase. The setup phase may be similar to the setup phase performed by the DTA 102 with respect to the DTA 102 and the DTS 104 of FIG. 1. For example, in some embodiments, the provisioning module 218 may generate transfer keys for a particular transfer of sensitive data. In some embodiments, the provisioning module 218 may receive transfer keys that are generated and provisioned from a DTS. In some embodiments, the provisioning module 218 may also generate an AIK, as described herein.

The data encryption module 220 may comprise code that causes the processor 202 to perform one or more operations of a data encryption phase. The data encryption phase may be similar to the data encryption phase performed by the DTA 102 in FIG. 1. For example, the data encryption phase may include one or more operations of 142-150.

In some embodiments, any one or more of the modules of the computer readable medium 210 may include and/or utilize any suitable encryption/decryption algorithms to encrypt/decrypt data in embodiments of the disclosure. For example, suitable data encryption/decryption algorithms may include DES, triple DES, AES, etc. These modules may utilize symmetric or asymmetric encryption techniques to encrypt and/or verify data.

Figure 3:
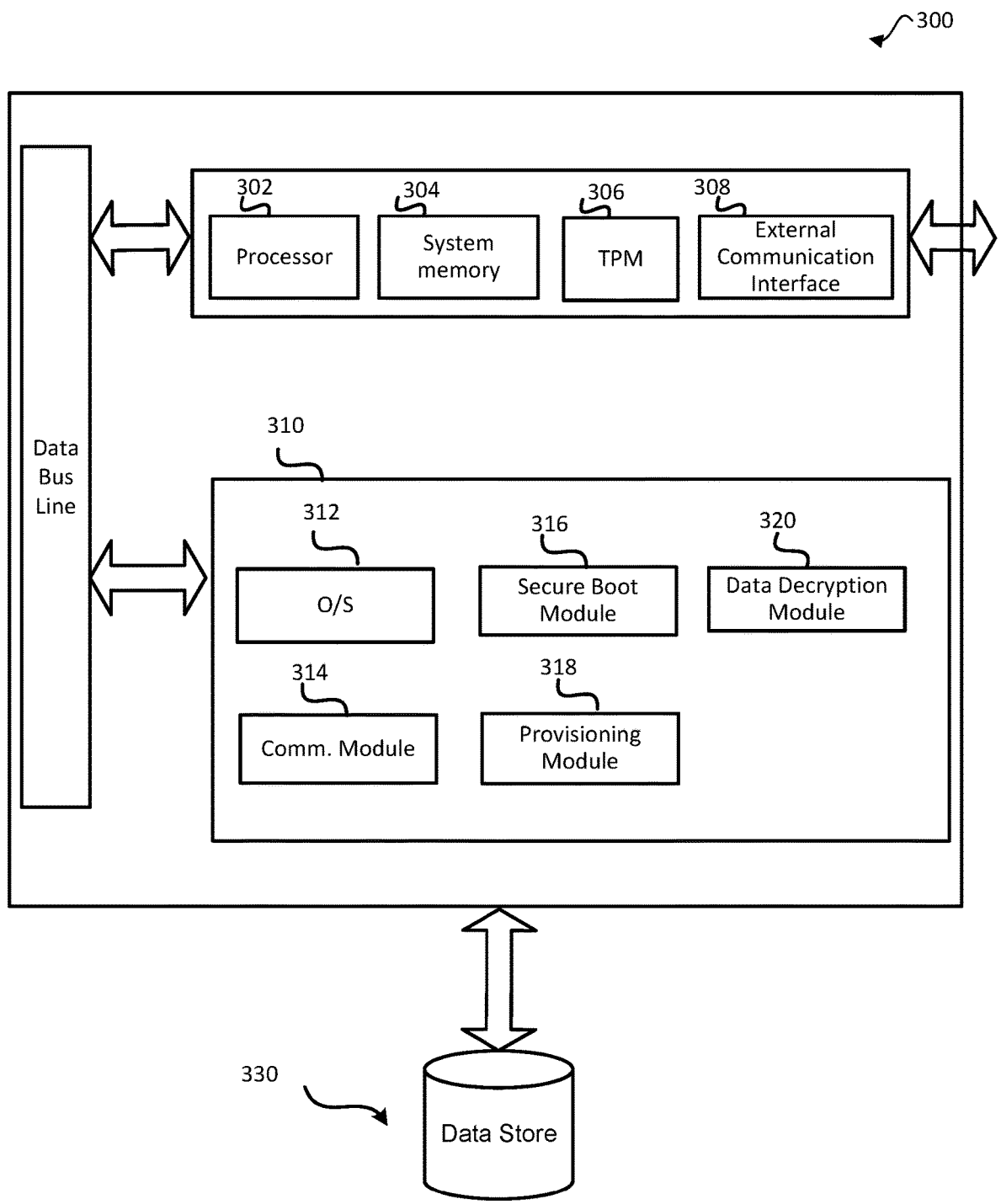
FIG. 3 is another simplified block diagram illustrating an example architecture of an endpoint device used to enable attested, end-to-end encryption between endpoints, according to some embodiments.

FIG. 3 is another simplified block diagram illustrating an example architecture of an endpoint device used to enable attested, end-to-end encryption between endpoints, according to some embodiments. The endpoint device 300 may correspond to a destination device (e.g., an OS device), which may be similar to OS 106 of FIG. 1. In some embodiments, the endpoint device 300 may correspond to any suitable computing device, including, for example a server computer, a PC, a mobile device, etc. It should be understood that, in some embodiments, a computing device may be configured to function, depending on the context, as both an origination device and a destination device.

Similar to device 200 of FIG. 2, the device 300 may include a processor 302, which may be coupled to a system memory 304, a TPM 306, and an external communication interface 308. A computer readable medium 310 may also be operatively coupled to the processor 302. A data store 330 may also be in operative communication with the processor 302. In some embodiments, the data store 330 may correspond to a public cloud, whereby, upon obtaining sensitive data from an origination device (e.g., device 200), the device 300 may upload the sensitive data to the public cloud. In some embodiments, the data store 330 may correspond to local storage, and/or any suitable storage mechanism.

The computer readable medium 310 may include an operating system 312 and one or more modules for implementing the features disclosed herein, including, a communications module 314, a secure boot module 316, a provisioning module 318, and a data decryption module 320. Similar to device 200, in some embodiments, the operations performed by one or more of the modules may utilize the TPM 306, as described herein. In some embodiments, the operations performed by one or more of the modules may be executed in a secure environment, whereby the operating system is booted in a trusted environment, and thereby the operating system may be considered trusted. In some embodiments, one or more of the operations may be performed within an elevated privilege level (e.g., Locality 2 of the Intel TXT) of the secure environment.

Turning to specific modules of the computer readable medium 310 in further detail, the communications module 314 may comprise code that causes the processor 302 to generate messages, forward messages, reformat messages, and/or otherwise communicate with other entities. For example, as described herein, the communications module 314 may transmit and/or receive messages from a third-party device (e.g., a DTS, similar to DTS 104 of FIG. 1) and or an origination device (e.g., a DTA, similar to DTA 102 of FIG. 1). For example, the communications module 314 may receive encrypted data and/or a signed and encrypted DEK from the origination device. In some embodiments, the communications module 314 may use any suitable communication path (e.g., the Internet, a LAN, etc.).

The secure boot module 316 may comprise code that causes the processor 302 to ensure that the device 300 operates in a secure environment. In some embodiments, the secure boot module 316 may perform similar operations as the secure boot module 216 of FIG. 2, for example, enabling a secure environment.

The provisioning module 318 may comprise code that causes the processor 302 to perform one or more operations of a setup phase. The setup phase may be similar to the setup phase performed by the OS 106 with respect to the OS 106 and the DTS 104 of FIG. 1. For example, in some embodiments, the provisioning module 318 may generate transfer keys for a particular transfer of sensitive data. In some embodiments, the provisioning module 318 may receive transfer keys that are generated and provisioned from a DTS. In some embodiments, the provisioning module 318 may also generate an AIK, as described herein.

The data decryption module 320 may comprise code that causes the processor 302 to perform one or more operations of a data decryption phase. The data decryption phase may be similar to the data decryption phase performed by the OS 106 in FIG. 1. For example, the data decryption phase may include one or more operations of 156-162.

In some embodiments, any one or more of the modules of the computer readable medium 310 may include and/or utilize any suitable encryption/decryption algorithms to encrypt/decrypt data in embodiments of the disclosure. For example, suitable data encryption/decryption algorithms may include DES, triple DES, AES, etc. These modules may utilize symmetric or asymmetric encryption techniques to encrypt and/or verify data.

Figure 4:
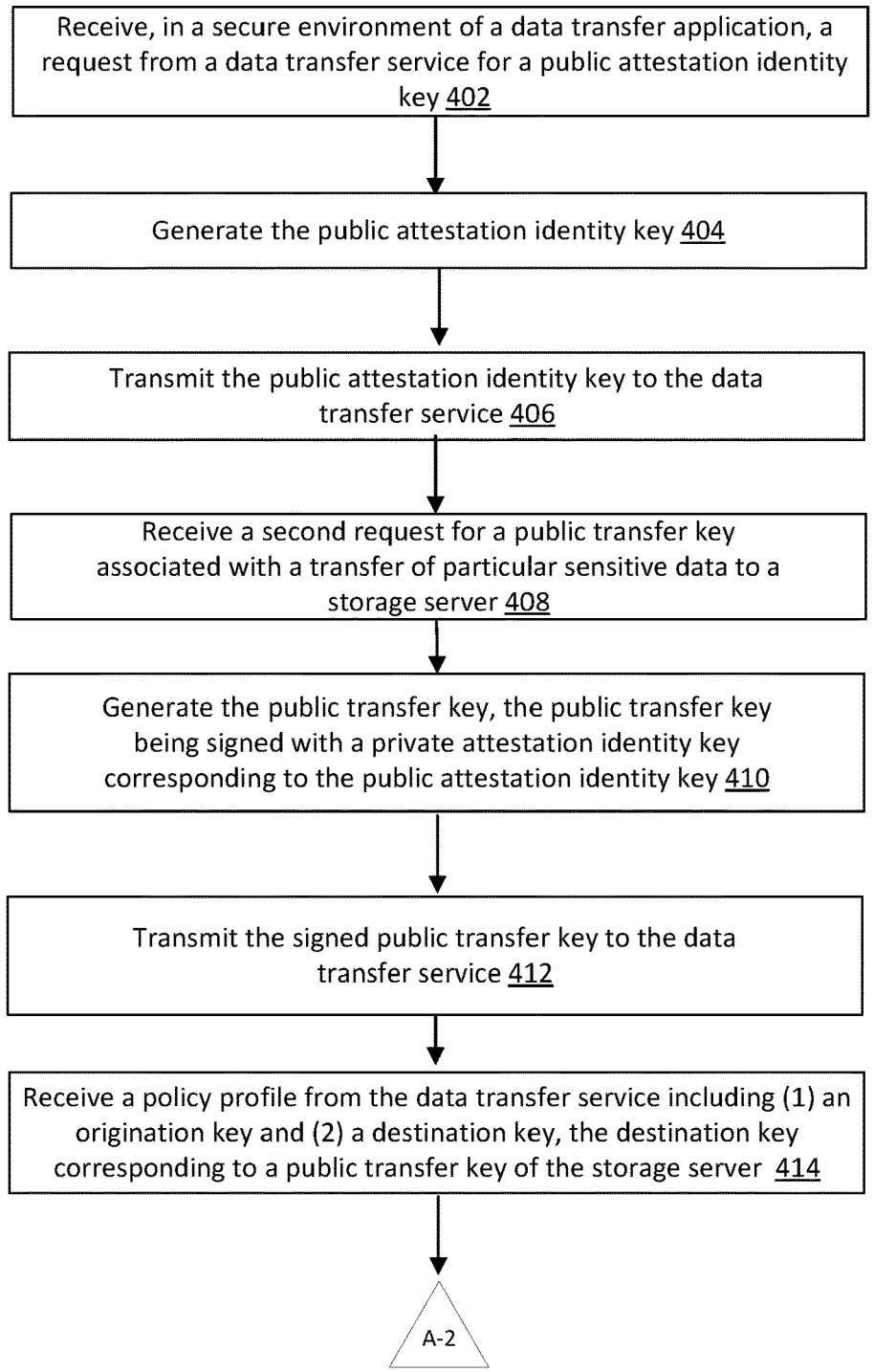
FIG. 4 is a simplified flow diagram illustrating an example process for providing attested, end-to-end encryption between endpoints, according to some embodiments.

FIG. 4 is a simplified flow diagram illustrating an example process 400 for providing attested, end-to-end encryption between endpoints, according to some embodiments. In some embodiments, the process 400 may be performed by an origination device which may be similar to any of the origination devices (e.g., DTA$_S$) described herein. In some embodiments, the process 400 may correspond to a setup phase that is performed by the origination device between the origination device and a data transfer service (which may be any DTS described herein). The setup phase may be performed to provision the origination device with keys and/or instructions (e.g., a policy profile) for performing the data encryption phase (described with respect to process 500 of FIG. 5). It should be understood that one or more of the operations (e.g., a subset or all) described with respect to processes 400, 500, 600, and/or 700 respectively, of FIGS. 4, 5, 6, and 7 (described below) may be performed within a secure environment (e.g., a trusted platform and/or at an elevated privilege level for accessing a TPM of the secure environment).

Process 400, 500, 600, and 700 are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 402, an origination device (e.g., a data transfer application, for example, DTA 102, device 200) may receive, in a secure environment, a request from a data transfer service (e.g., DTS 104) for a public attestation identity key. The public attestation identity key may correspond to a private attestation identity key of the data transfer application. In some embodiments, one or more of the operations of block 402 may be similar to one or more of the operations of 110 of FIG. 1.

At block 404, the data transfer application may generate, in the secure environment, the public attestation identity key and the corresponding private attestation identity key. In some embodiments, the attestation identity keys are ephemeral keys. In some embodiments, the public attestation identity key may be signed by the device with a private endorsement key of the data transfer application. The private endorsement key may correspond to a public endorsement key of the data transfer application. In some embodiments, one or more of the operations of block 404 may be similar to one or more of the operations of 114 of FIG. 1.

At block 406, the data transfer application may transmit the public attestation identity key to the data transfer service. The data transfer service may utilize the public endorsement key to verify the signed public attestation identity key of the data transfer application. In some embodiments, one or more of the operations of block 406 may be similar to one or more of the operations of 118 of FIG. 1.

At block 408, the data transfer application may receive, in the secure environment, a second request for a public transfer key. The public transfer key may be associated with a transfer of particular sensitive data from the data transfer application to a destination device (e.g., a storage server, for example OS 106). In some embodiments, one or more of the operations of block 408 may be similar to one or more of the operations of 126 of FIG. 1.

At block 410, the data transfer application may generate, in the secure environment, the public transfer key of the data transfer application. The public transfer key may one of a pair of transfer keys that include the public transfer key and a corresponding private transfer key. In some embodiments, the transfer keys are ephemeral keys. In some embodiments, one or more of the operations of block 410 may be similar to one or more of the operations of 130 of FIG. 1.

At block 412, the data transfer application may transmit a signed public transfer key to the data transfer service. In some embodiments, prior to transmitting the signed public transfer key of the data transfer application to the data transfer service, the data transfer application may sign the public transfer key with the private attestation identity key of the data transfer application, thereby attesting to an identity of the data transfer application. Accordingly, the data transfer service may use the corresponding public attestation identity key of the data transfer application to verify the signature and obtain (e.g., decrypt) the public transfer key of the data transfer application. In some embodiments, the data transfer application may also seal the corresponding private transfer key. In some embodiments, one or more of the operations of block 412 may be similar to one or more of the operations of 134 of FIG. 1.

At block 414, the data transfer application may receive, in the secure environment, a policy profile from the data transfer service including (1) an origination key and (2) a destination key. In some embodiments, the destination key may correspond to a public transfer key of the storage server that is associated with the transfer of the particular sensitive data from the data transfer application to the storage server. In some embodiments, following the completion of the operations of block 414, the data transfer application may complete the setup phase, whereby the data transfer application is provisioned with cryptographic keys (e.g., transfer keys) and instructions (e.g., within the policy profile) for autonomously performing the end-to-end encryption process described herein. In some embodiments, one or more of the operations of block 414 may be similar to one or more of the operations of 138 of FIG. 1.

Figure 5:
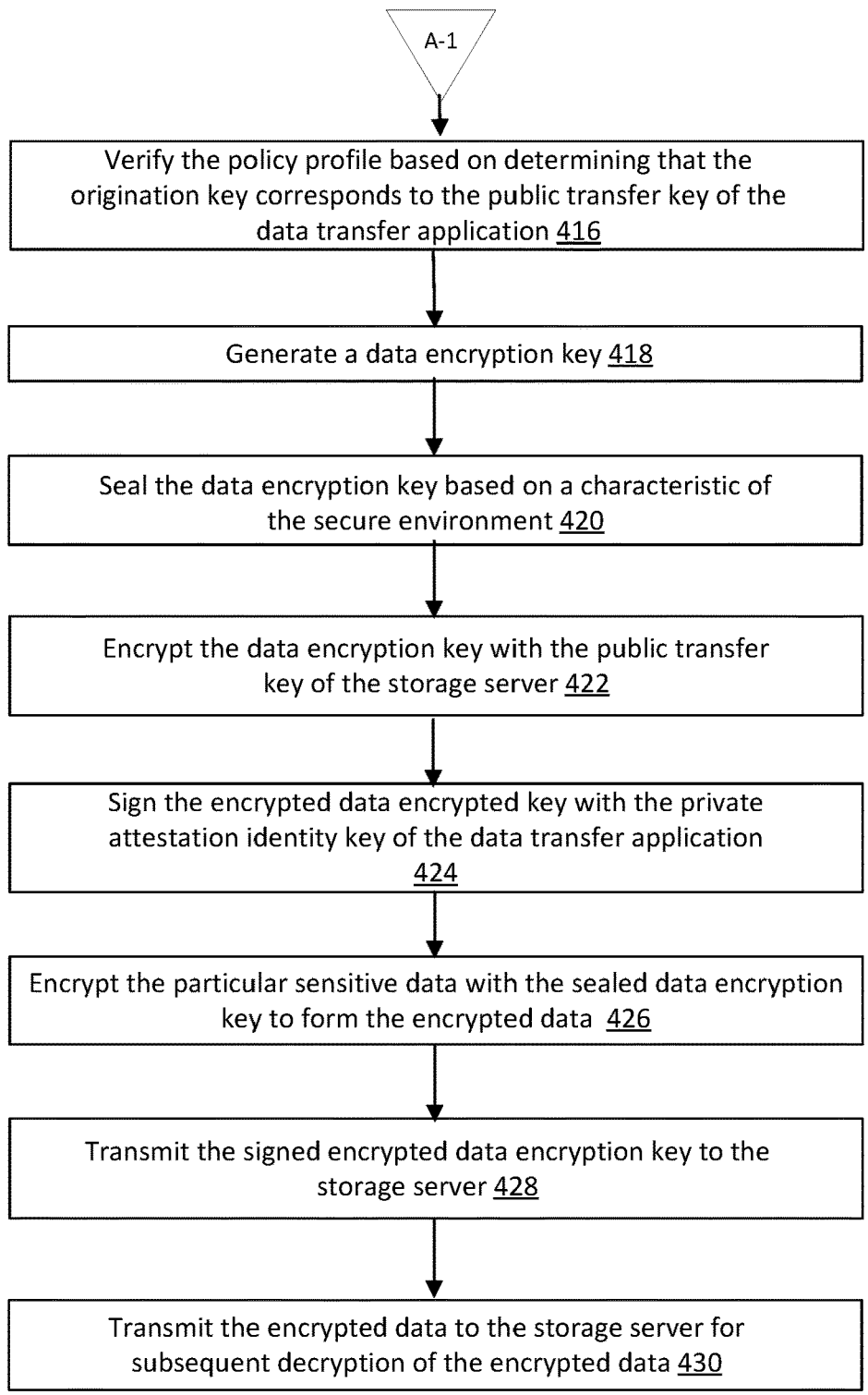
FIG. 5 is another simplified flow diagram illustrating an example process for providing attested, end-to-end encryption between endpoints, according to some embodiments.

Accordingly, the setup phase of process 400 may continue at A-2 to a data encryption phase, illustrated by process 500 of FIG. 5. It should be understood that, although the setup phase and the data encryption phase are described as distinct phases, in some embodiments, the phases may be performed in one process flow. Also, in some embodiments, one or more of the operations of one flow may instead be performed as part of another flow. For example, in one embodiment, and, as described below, the data transfer application may receive (e.g., retrieve) and verify the policy profile received from the data transfer service as part of a data encryption phase. For example, as illustrated above, a service provider may initially provision a DTA device for a customer, including the transfer keys and a policy profile. The DTA may then be shipped to the customer premises. When the DTA is securely booted at the customer premises (e.g., for loading and encrypting the sensitive data), the DTA may then retrieve the previously provisioned policy profile and verify its accuracy as part of performing the data encryption phase.

FIG. 5 is another simplified flow diagram illustrating an example process 500 for providing attested, end-to-end encryption between endpoints, according to some embodiments. As described above, process 500 may correspond to a data encryption phase that follows a completion A-1 of the setup (provisioning) phase of process 400 of FIG. 4. The process 500 may be performed by the same origination device (e.g., the data transfer application, for example, DTA 102) as described in reference to process 400.

At block 416, the data transfer application may verify, in a secure environment (e.g., the secure environment discussed in reference to process 400), the policy profile (e.g., received at block 414 of process 400) based on determining that the origination key of the policy profile corresponds to the public transfer key of the data transfer application. For example, the data transfer application may be launched (e.g., booted) and retrieve the previously provisioned policy profile to perform the verification on the profile. In some embodiments, one or more of the operations of block 416 may be similar to one or more of the operations of 142 of FIG. 1.

At block 418, the data transfer application may generate, in the secure environment, a data encryption key. In some embodiments, one or more of the operations of block 418 may be similar to one or more of the operations of 144 of FIG. 1. In some embodiments, the data encryption key have been previously generated and then subsequently loaded onto the data transfer application with the secure environment.

At block 420, the data transfer application may seal, in the secure environment, the data encryption key based at least in part on a characteristic (e.g., software and/or platform components) of the secure environment. In some embodiments, one or more of the operations of block 420 may be similar to one or more of the operations of 146 of FIG. 1.

At block 422, the data transfer application may encrypt (e.g., wrap), in the secure environment, the sealed data encryption key with the public transfer key of the storage server (e.g., previously received from the data transfer service in the policy profile). Accordingly, the sealed data encryption key may be encrypted to obtain an encrypted data encryption key. In some embodiments, one or more of the operations of block 422 may be similar to one or more of the operations of 148 of FIG. 1.

At block 424, the data transfer application may sign, in the secure environment, the encrypted data encryption key with the private attestation identity key of the data transfer application. It should be understood that, in some embodiments the public transfer key of the data transfer application and the private attestation identity key of the data transfer application may have been transmitted by the data transfer service (e.g., within a second policy profile) to the storage server (e.g., see 140 of FIG. 1). Accordingly, the storage server may subsequently use the public attestation identity key to verify the signature of encrypted data encryption key by the private attestation identity key (e.g., see 158 of FIG. 1, described further with respect to FIG. 7). In some embodiments, one or more of the operations of block 424 may be similar to one or more of the operations of 148 of FIG. 1.

At block 426, the data transfer application may encrypt, in the secure environment, the particular sensitive data with the sealed data encryption key to form encrypted data. In some embodiments, one or more of the operations of block 426 may be similar to one or more of the operations of 150 of FIG. 1. In some embodiments, prior to encrypting the particular sensitive data, the sensitive data may be loaded from a data source (e.g., the data store 230 of FIG. 2). Once the particular sensitive data is loaded onto the system, the data transfer application may encrypt the particular sensitive data. In some embodiments, the data encryption phase may be completed upon the completion of the operations of block 426.

At block 428, the data transfer application may transmit the signed encrypted data encryption key to the storage server. In some embodiments, one or more of the operations of block 428 may be similar to one or more of the operations of 152 of FIG. 1.

At block 430, the data transfer application may transmit the encrypted data to the storage server for subsequent decryption of the encrypted data. In some embodiments, one or more of the operations of block 430 may be similar to one or more of the operations of 154 of FIG. 1.

Figure 6:
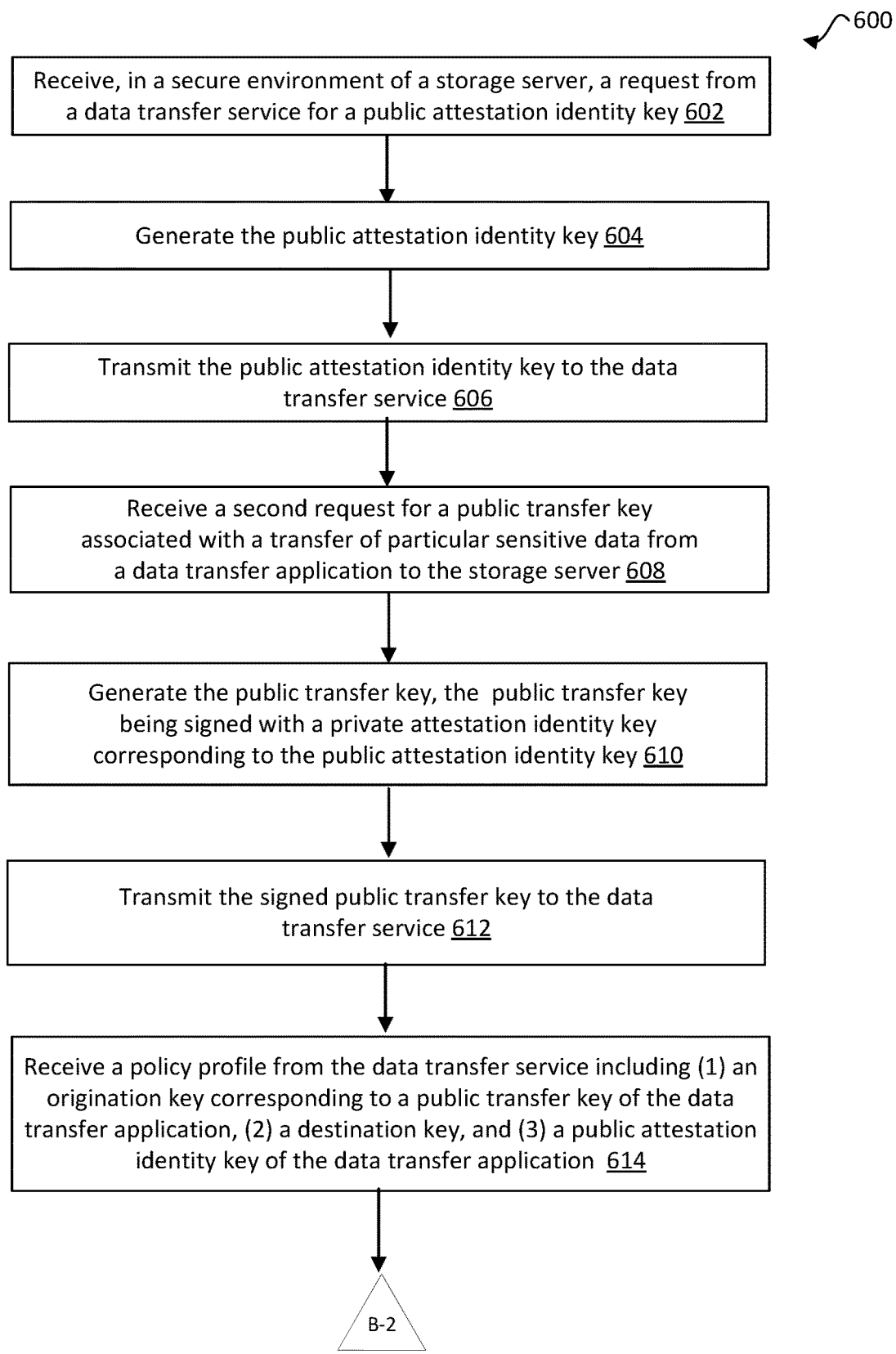
FIG. 6 is another simplified flow diagram illustrating an example process for providing attested, end-to-end encryption between endpoints, according to some embodiments.

FIG. 6 is another simplified flow diagram illustrating an example process 600 for providing attested, end-to-end encryption between endpoints, according to some embodiments. In some embodiments, the process 600 may be performed by a destination device which may be similar to any of the destination devices (e.g., OSs) described herein. In some embodiments, the process 600 may correspond to a setup phase that is performed by the destination device between the destination device and a DTS (which may be any DTS described herein). The setup phase may be performed to provision the destination device with keys and/or instructions for performing the data decryption phase (described with respect to process 700 of FIG. 7).

At block 602, a destination device (e.g., a storage server, for example, OS 106) may receive, in a secure environment, a request from a data transfer service (e.g., DTS 104) for a public attestation identity key that attests to an identity of the storage server. The public attestation identity key may correspond to a private attestation identity key of the storage server. In some embodiments, one or more of the operations of block 602 may be similar to one or more of the operations of 112 of FIG. 1.

At block 604, the storage server may generate, in the secure environment, the public attestation identity key and the corresponding private attestation identity key. In some embodiments, the attestation identity keys are ephemeral keys. In some embodiments, the public attestation identity key may be signed by the storage server with a private endorsement key of the storage server. The private endorsement key may correspond to a public endorsement key of the storage server. In some embodiments, one or more of the operations of block 604 may be similar to one or more of the operations of 116 of FIG. 1.

At block 606, the storage server may transmit the public attestation identity key to the data transfer service. The data transfer service may utilize the public endorsement key to verify the signed public attestation identity key of the data transfer application. In some embodiments, one or more of the operations of block 606 may be similar to one or more of the operations of 120 of FIG. 1.

At block 608, the storage server may receive, in the secure environment, a second request for a public transfer key. The public transfer key may be associated with a transfer of particular sensitive data from a data transfer application (e.g., DTA 102) to the storage server. In some embodiments, one or more of the operations of block 608 may be similar to one or more of the operations of 128 of FIG. 1.

At block 610, the storage server may generate, in the secure environment, the public transfer key of the storage server. The public transfer key may one of a pair of transfer keys that include the public transfer key and a corresponding private transfer key. In some embodiments, the transfer keys are ephemeral keys. In some embodiments, one or more of the operations of block 610 may be similar to one or more of the operations of 132 of FIG. 1

At block 612, the storage server may transmit a signed public transfer key to the data transfer service. In some embodiments, prior to transmitting the signed public transfer key of the storage server to the data transfer service, the storage server may sign the public transfer key with the private attestation identity key of the storage server, thereby attesting to an identity of the storage server. Accordingly, the data transfer service may use the corresponding public attestation identity key of the storage server to verify the signature and obtain (e.g., decrypt) the public transfer key of the storage server. In some embodiments, the storage server may also seal the corresponding private transfer key. In some embodiments, one or more of the operations of block 612 may be similar to one or more of the operations of 136 of FIG. 1.

At block 614, the storage server may receive, in the secure environment, a policy profile from the data transfer service including (1) an origination key that corresponds to a public transfer key of the data transfer application that is associated with the transfer of the particular sensitive data from the data transfer application to the storage server, (2) a destination key, and (3) a public attestation identity key of the data transfer application (e.g., previously received by the data transfer service from the data transfer application (e.g., at block 406 of FIG. 4). In some embodiments, following the completion of the operations of block 614, the storage server may complete the setup phase, whereby the storage server is provisioned with cryptographic keys (e.g., transfer keys) and instructions (e.g., within the policy profile) for autonomously performing the end-to-end encryption process described herein. In some embodiments, one or more of the operations of block 614 may be similar to one or more of the operations of 140 of FIG. 1.

Figure 7:
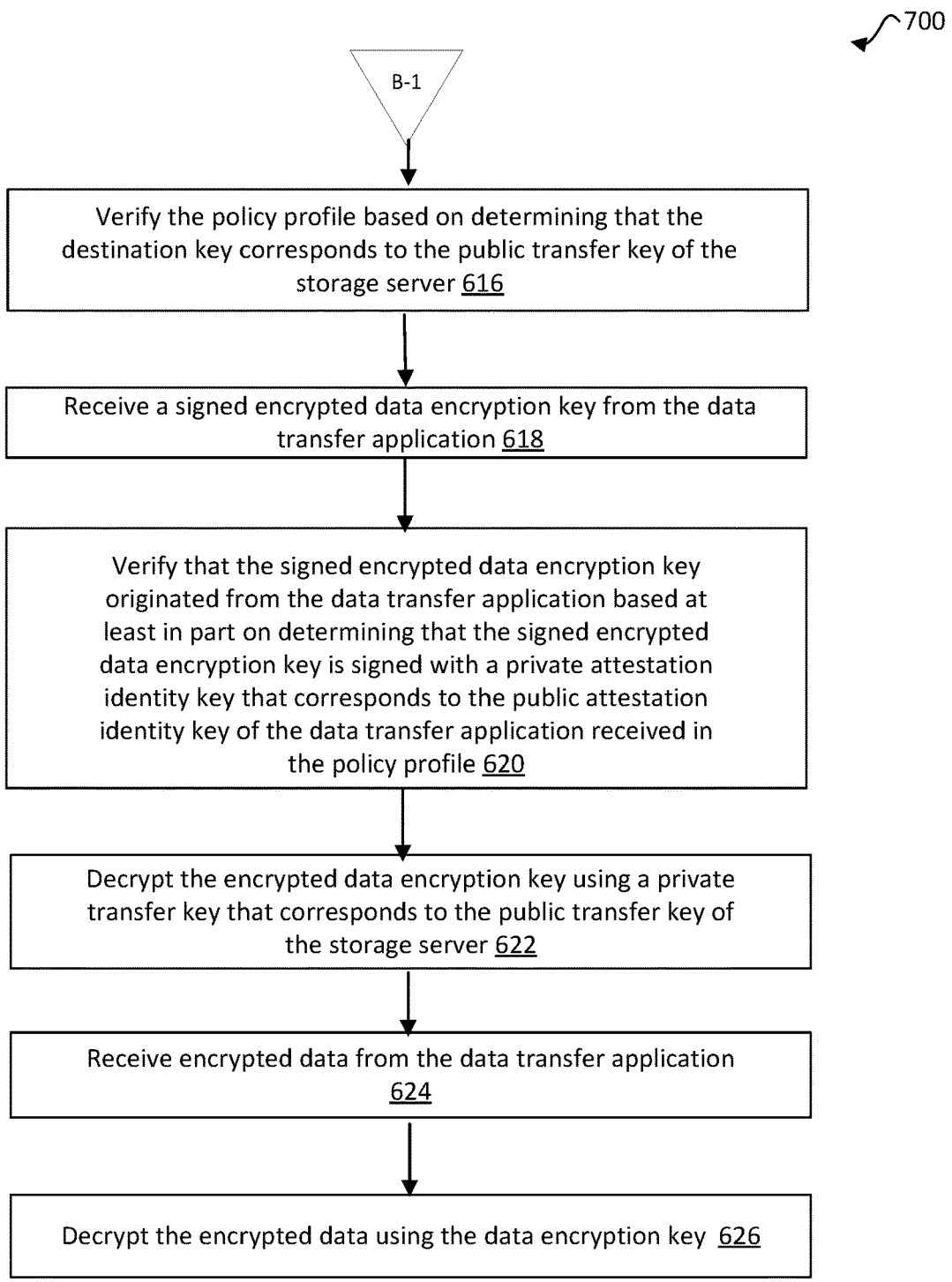
FIG. 7 is another simplified flow diagram illustrating an example process for providing attested, end-to-end encryption between endpoints, according to some embodiments.

Accordingly, the setup phase of process 600 may continue at B-2 to a data decryption phase, illustrated by process 700 of FIG. 7. It should be understood that, although the setup phase and the data decryption phase are described as distinct phases, in some embodiments, the phases may be performed in one process flow (e.g., upon receiving encrypted data and a signed encrypted key from the origination device). Also, in some embodiments, one or more of the operations of one flow may instead be performed as part of another flow. For example, the storage server may have previously been provisioned with the policy profile by receiving the profile from the data transfer service, and then have stored the policy profile. Then, at a later time (e.g., when the counterpart origination device arrives on-premises at the service provider for transmitting the encrypted data to the storage server), the storage server may retrieve the policy file and then verify that the policy file (e.g., that the storage server should proceed to receive and decrypt data from the particular origination device).

FIG. 7 is another simplified flow diagram illustrating an example process for providing attested, end-to-end encryption between endpoints, according to some embodiments. As described above, process 700 may correspond to a data decryption phase that follows a completion B-1 of the setup (provisioning) phase of process 600 of FIG. 6. The process 700 may be performed by the same destination device (e.g., the storage server, for example OS 106) as described in reference to process 600.

At block 616, the storage server may verify, in a secure environment (e.g., the secure environment discussed in reference to process 600), the policy profile (e.g., received at block 614 of process 600) based on determining that the destination key of the policy profile corresponds to the public transfer key of the storage server. In some embodiments, one or more of the operations of block 616 may be similar to one or more of the operations of 156 of FIG. 1.

At block 618, the storage server may receive a signed encrypted data encryption key from the data transfer application (e.g., DTA 102). The data transfer application may be associated with the origination key received in the policy profile at block 614. In some embodiments, one or more of the operations of block 618 may be similar to one or more of the operations of 152 of FIG. 1.

At block 620, the storage server may verify that the signed encrypted data encryption key originated from the data transfer application. This verification may be based at least in part on determining that the signed encrypted data encryption key is signed with a private attestation identity key that corresponds to the public attestation identity key of the data transfer application received in the policy profile. In some embodiments, one or more of the operations of block 620 may be similar to one or more of the operations of 158 of FIG. 1.

At block 622, the storage server may decrypt (e.g., unwrap) the encrypted data encryption key using a private transfer key that corresponds to the public transfer key of the storage server. In some embodiments, the private transfer key may be previously be generated at block 610 of FIG. 6. In some embodiments, one or more of the operations of block 620 may be similar to one or more of the operations of 160 of FIG. 1.

At block 624, the storage server may receive encrypted data from the data transfer application. In some embodiments, one or more of the operations of block 624 may be similar to one or more of the operations of 154 of FIG. 1. It should be understood that, as described herein, the order of one or more operations of blocks 618-626 may vary, depending, for example, on an order in which the encrypted data and the signed encrypted date encryption key are received.

For example, in one embodiment, the storage server may receive the encrypted data prior to the operations of block 620.

At block 626, the storage server may decrypt the encrypted data using the data encryption key to obtain the particular sensitive data. In some embodiments, one or more of the operations of block 626 may be similar to one or more of the operations of 162 of FIG. 1. As described herein, following obtaining the particular sensitive data, the storage server may locally store the data. In some embodiments, the storage server may upload the particular sensitive data to a cloud storage using any suitable mechanism (e.g., a VPN connection).

In embodiments described herein, techniques for enabling an autonomous mechanism that provides attested, end-to-end encryption for transporting sensitive data between endpoints are disclosed. In accordance with one embodiment, a method is disclosed. The method includes receiving, in a secure environment of a storage server, a policy profile from a data transfer service including: (1) an origination key corresponding to a public transfer key of a data transfer application that is associated with a transfer of particular sensitive data from the data transfer application to the storage server, (2) a destination key, and (3) a public attestation identity key of a data transfer application. The method further includes verifying, by the storage server in the secure environment, the policy profile based at least in part on determining that the destination key corresponds to a public transfer key of the storage server. The method further includes receiving, by the storage server in the secure environment, a signed encrypted data encryption key from the data transfer application. The method further includes verifying, by the storage server in the secure environment, that the signed encrypted data encryption key originated from the data transfer application based at least in part on determining that the signed encrypted data encryption key is signed with a private attestation identity key that corresponds to the public attestation identity key of the data transfer application received in the policy profile. The method further includes decrypting, by the storage server in the secure environment, the encrypted data encryption key using a private transfer key that corresponds to the public transfer key of the storage server. The method further includes receiving, by the storage server in the secure environment, encrypted data from the data transfer application. The method further includes decrypting, by the storage server in the secure environment, the encrypted data using the data encryption key to obtain the particular sensitive data.

In some embodiments, the method further includes receiving, by the storage server in the secure environment, a request for the public transfer key of the storage server that is associated with the transfer of the particular sensitive data from the data transfer application to the storage server. The method further includes generating, by the storage server in the secure environment, the public transfer key of the storage server, the public transfer key being signed with a private attestation identity key of the storage server. The method further includes transmitting, by the storage server, the signed public transfer key to the data transfer service.

In some embodiments, the method further includes receiving, in the secure environment of the storage server, a request from the data transfer service for a public attestation identity key that attests to an identity of the storage server. The method further includes generating, by the storage server in the secure environment, the public attestation identity key. The method further includes transmitting, by the storage server, the public attestation identity key to the data transfer service.

In some embodiments, the method further includes receiving, by the storage server in the secure environment, a pair of transfer keys including the public transfer key and a corresponding private transfer key of the storage server. In some embodiments, the pair of transfer keys is provisioned to the storage server from the data transfer service and associated with the transfer of the particular sensitive data from the data transfer application to the storage server.

In some embodiments, the method further includes generating the private attestation identity key of the data transfer application in a secure environment of the data transfer application. In some embodiments, the secure environment includes a trusted platform module (TPM), whereby the private attestation identity key is generated based at least in part on the trusted platform module.

Other embodiments of the invention can be directed to a storage server device configured to perform the above-noted method.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed should first be set up. In some instances, the provisioning can be done manually, a provisioning tool may be utilized to provision the resources, and/or deployment tools may be utilized to deploy the code once the infrastructure is provisioned.

Figure 8:
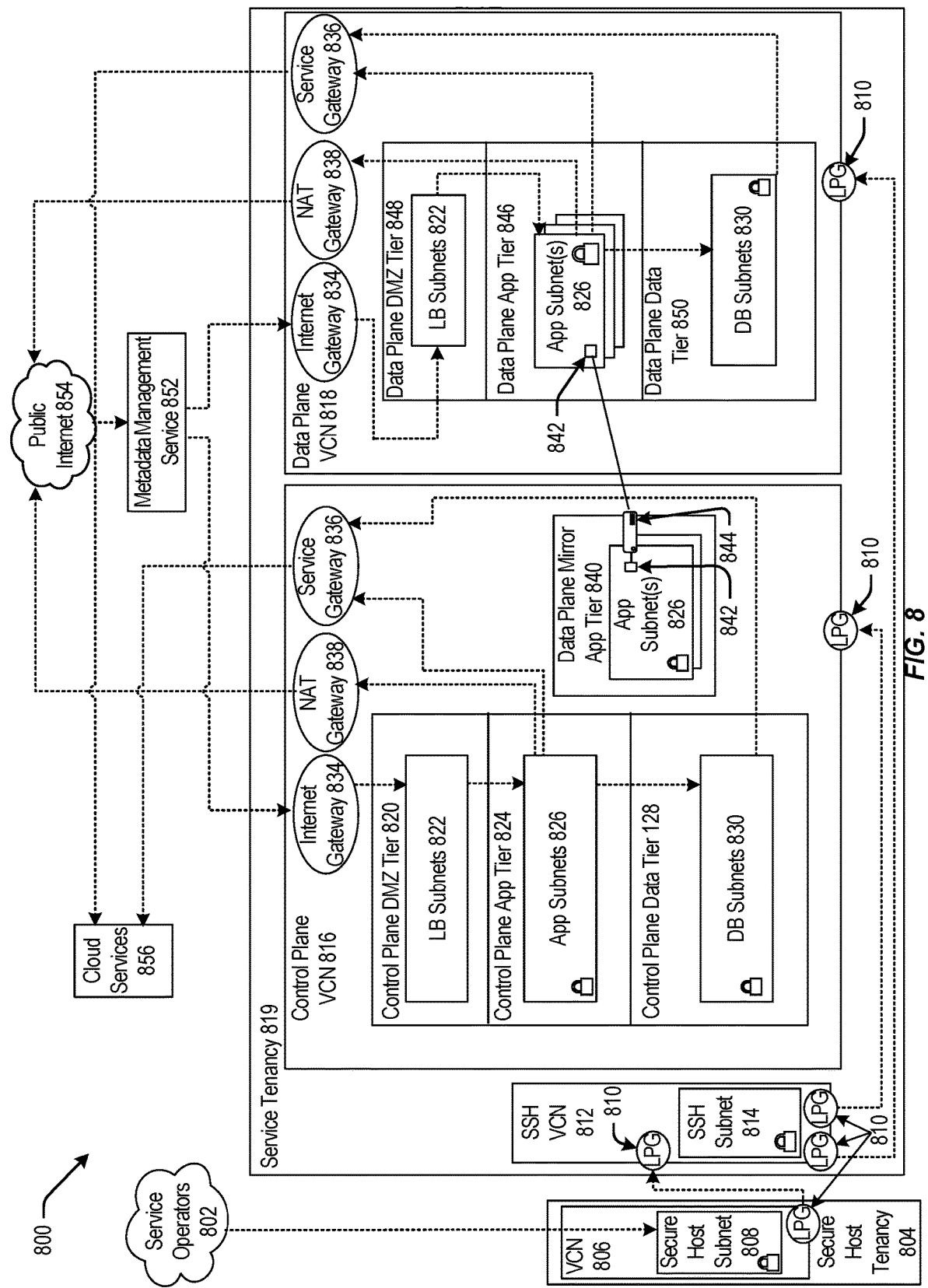
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plan VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
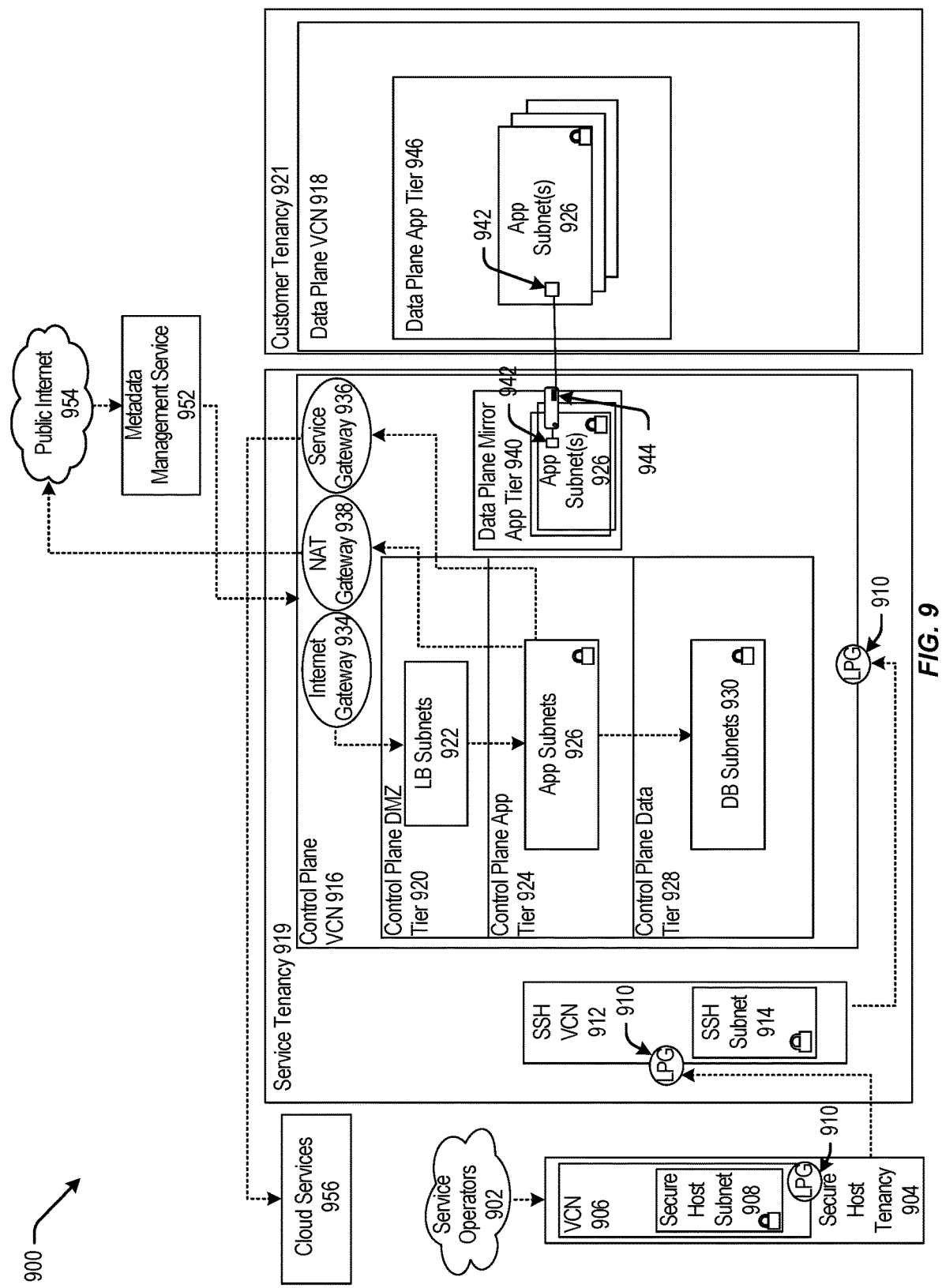
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plan app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
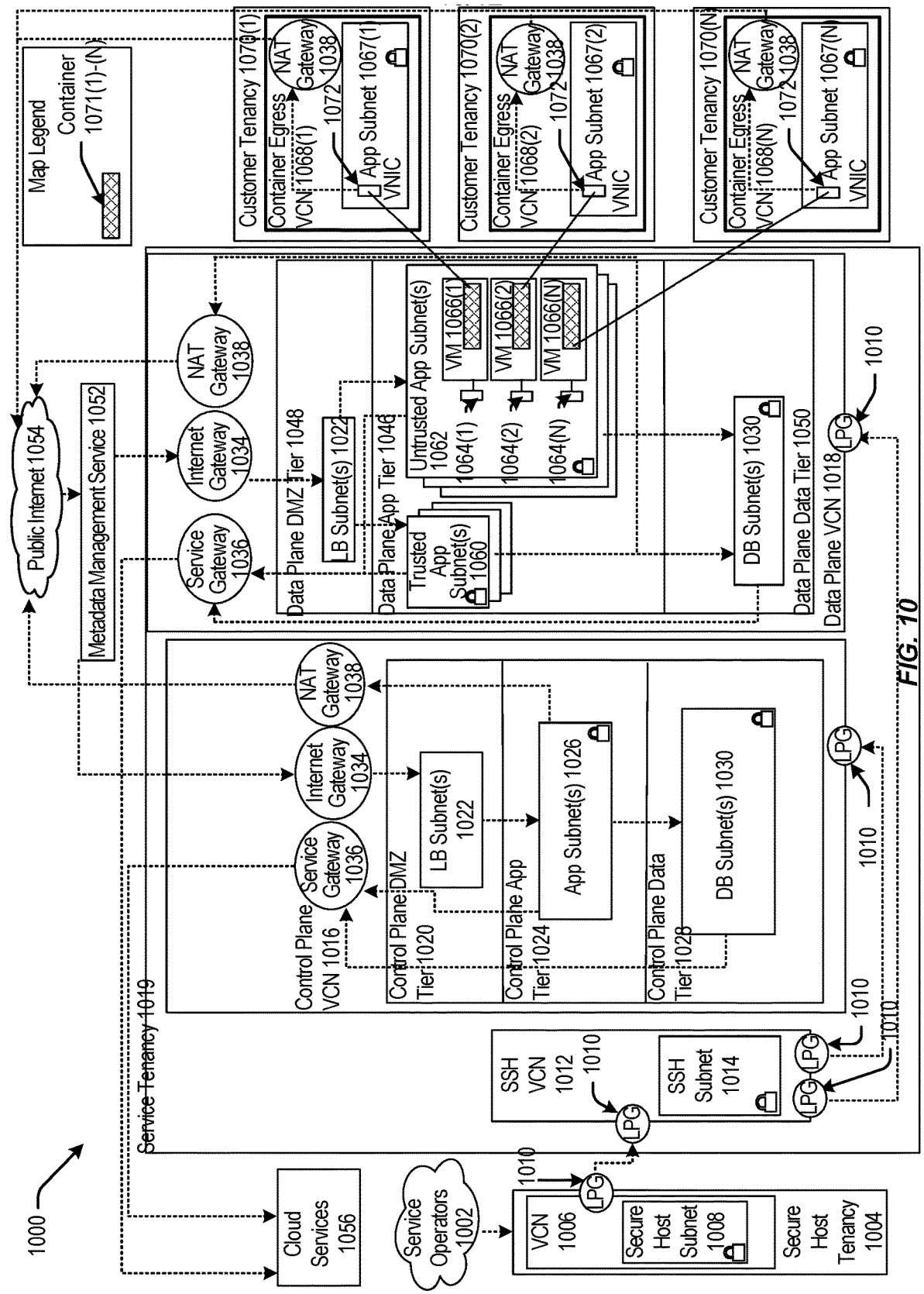
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
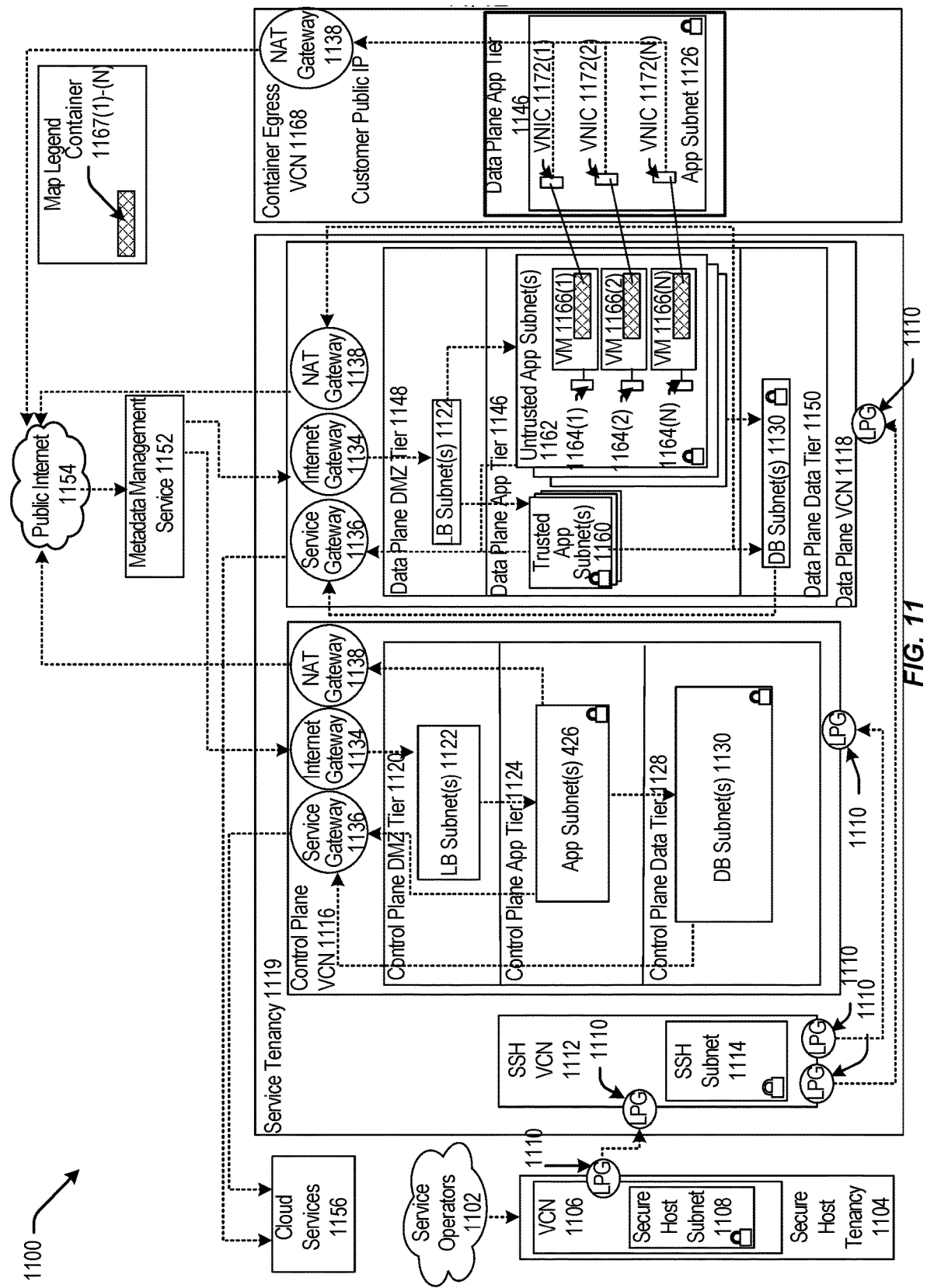
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
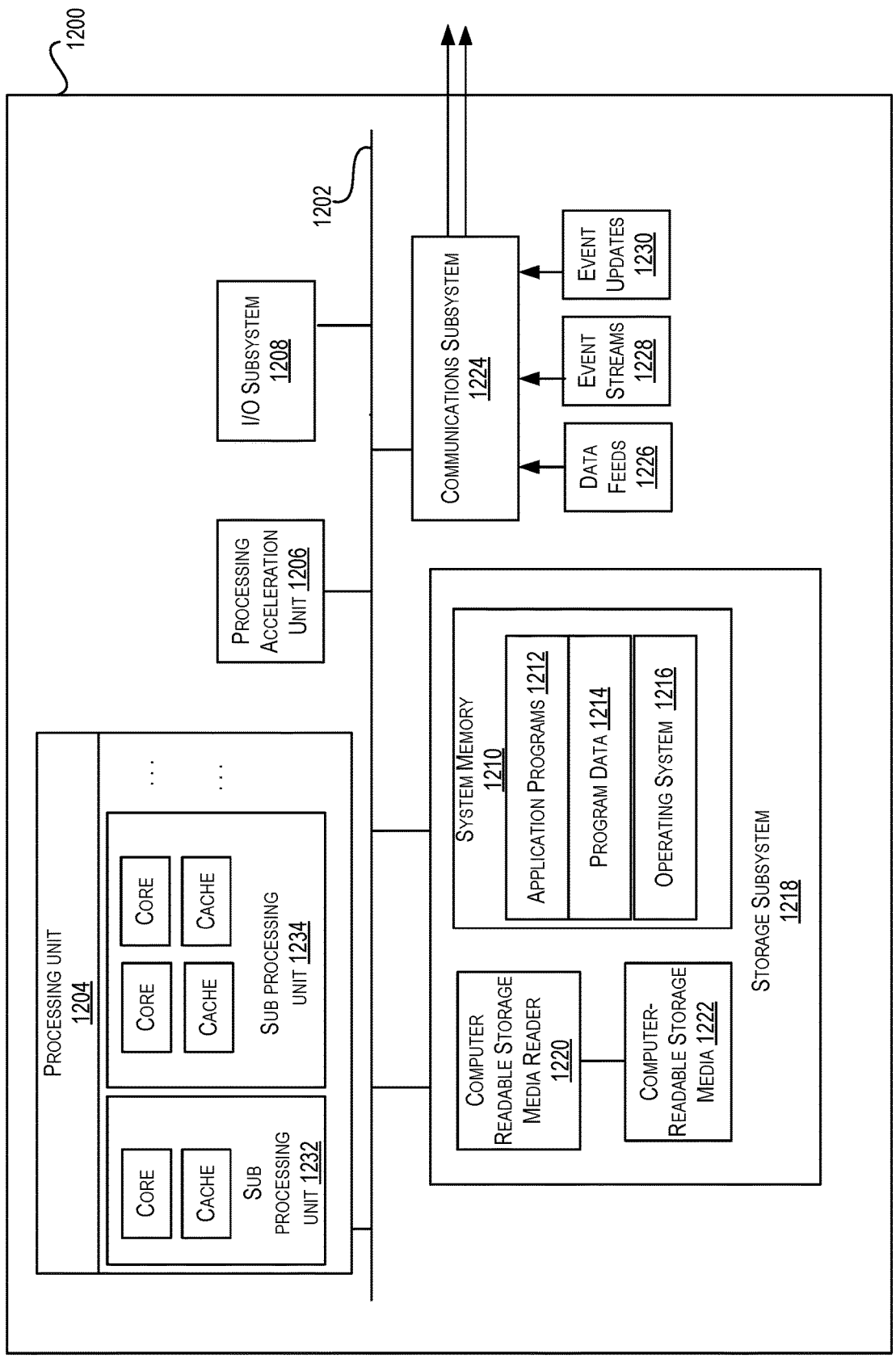
FIG. 12 is a block diagram illustrating an example computer system, according to at least one embodiment.

FIG. 12 illustrates an example computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, in a secure environment of a storage server, a policy profile from a data transfer service, the policy profile including an origination key and a destination key, and the origination key corresponding to a public transfer key of a data transfer application that is associated with a transfer of particular sensitive data from the data transfer application to the storage server;
   verifying, by the storage server in the secure environment, the policy profile based at least in part on determining that the destination key corresponds to a public transfer key of the data transfer application;
   receiving, by the storage server, a signed encrypted data encryption key from the data transfer application;
   receiving, by the storage server, encrypted data from the data transfer application for subsequent decryption of the encrypted data;
   verifying, by the storage server, the signed encrypted data encryption key originated from the data transfer application based at least in part on determining that the signed encrypted data key is signed with a private attestation identity key that corresponds to a public attestation identity key of the data transfer application; and
   decrypting, by the storage server, the encrypted data using a private transfer key of the storage server, the decrypted data corresponding to the particular sensitive data.

2. The computer-implemented method of claim 1, wherein the method further comprises:
   receiving, by the storage server in the secure environment, a request for the public transfer key of the storage server that is associated with the transfer of the particular sensitive data from the data transfer application to the storage server;
   generating, by the storage server in the secure environment, the public transfer key of the storage server, the public transfer key being signed with a private attestation identity key of the storage server; and
   transmitting, by the storage server, the signed public transfer key to the data transfer service.

3. The computer-implemented method of claim 1, wherein the method further comprises:
   receiving, in the secure environment of the storage server, a request from the data transfer service for a public attestation identity key that corresponds to the private attestation identity key of the storage server;
   generating, by the storage server in the secure environment, the public attestation identity key and the corresponding private attestation identity key; and
   transmitting, by the storage server, the public attestation identity key to the data transfer service.

4. The computer-implemented method of claim 3, wherein the public attestation identity key is signed by the storage server with a private endorsement key of the storage server, and wherein a public endorsement key corresponding to the private endorsement key is used by the storage server to verify the signed public attestation identity key of the storage server.

5. The computer-implemented method of claim 1, wherein the secure environment includes a trusted platform module (TPM).

6. The computer-implemented method of claim 5, wherein the private attestation identity key is generated based at least in part on the trusted platform module of the storage server.

7. The computer-implemented method of claim 1, wherein a public attestation identity key corresponding to the private attestation identity key of the storage server is included within a second policy profile that is received by the data transfer application from the data transfer service, the public attestation identity key being used by the storage server to verify that the signed encrypted data encryption key originated from the data transfer application.

8. The computer-implemented method of claim 1, wherein the method further comprises receiving, by the data transfer application in the secure environment, a pair of transfer keys including the public transfer key and a corresponding private transfer key of the storage server, the pair of transfer keys being provisioned to the storage server from the data transfer service and associated with the transfer of the particular sensitive data from the data transfer application to the storage server.

9. A device, comprising:
   a processor; and
   a computer-readable medium including instructions that, when executed by the processor, cause the processor to:
      receive a policy profile from a data transfer service, the policy profile including an origination key and a destination key, and the origination key corresponding to a public transfer key of a data transfer application that is associated with a transfer of particular sensitive data from the data transfer application to a storage server;
      verify the policy profile based at least in part on determining that the destination key corresponds to a public transfer key of the storage server;
      receive a signed encrypted data encryption key from the data transfer application;
      receive encrypted data from the data transfer application for subsequent decryption of the encrypted data;
      verify the signed encrypted data encryption key originated from the data transfer application based at least in part on determining that the signed encrypted data key is signed with a private attestation identity key that corresponds to a public attestation identity key of the data transfer application; and
      decrypt the encrypted data using a private transfer key of the storage server, the decrypted data corresponding to the particular sensitive data.

10. The device of claim 9, wherein the instructions, when executed, further cause the processor to:
    receive a request for the public transfer key of the storage server that is associated with the transfer of the particular sensitive data from the data transfer application to the storage server;
    generate the public transfer key of the storage server, the public transfer key being signed with a private attestation identity key of the storage server; and
    transmit the signed public transfer key to the data transfer service.

11. The device of claim 9, wherein the instructions, when executed, further cause the processor to:
    receive a request from the data transfer service for a public attestation identity key that corresponds to the private attestation identity key of the storage server;
    generate the public attestation identity key and the corresponding private attestation identity key; and
    transmit the public attestation identity key to the data transfer service.

12. The device of claim 11, wherein the public attestation identity key is signed by the storage server with a private endorsement key of the storage server, and wherein a public endorsement key corresponding to the private endorsement key is used by the storage server to verify the signed public attestation identity key of the storage server.

13. The device of claim 9, wherein the secure environment includes a trusted platform module (TPM).

14. The device of claim 13, wherein the private attestation identity key is generated based at least in part on the trusted platform module of the storage server.

15. The device of claim 9, wherein a public attestation identity key corresponding to the private attestation identity key of the storage server is included within a second policy profile that is received by the data transfer application from the data transfer service, the public attestation identity key being used by the storage server to verify that the signed encrypted data encryption key originated from the data transfer application.

16. The device of claim 9, wherein the instructions, when executed, further cause the processor to receive a pair of transfer keys including the public transfer key and a corresponding private transfer key of the storage server, the pair of transfer keys being provisioned to the storage server from the data transfer service and associated with the transfer of the particular sensitive data from the data transfer application to the storage server.

17. A non-transitory computer-readable medium including stored thereon a sequence of instructions that, when executed by a processor, causes the processor to perform operations comprising:
    receiving a policy profile from a data transfer service, the policy profile including an origination key and a destination key, the origination key corresponding to a public transfer key of a data transfer application that is associated with a transfer of particular sensitive data from the data transfer application to a storage server;
    verifying the policy profile based at least in part on determining that the destination key corresponds to a public transfer key of the storage server;
    receiving a signed encrypted data encryption key from the data transfer application;
    receiving encrypted data from the data transfer application for subsequent decryption of the encrypted data;
    verifying the signed encrypted data encryption key originated from the data transfer application based at least in part on determining that the signed encrypted data key is signed with a private attestation identity key that corresponds to a public attestation identity key of the data transfer application; and
    decrypting the encrypted data using a private transfer key of the storage server, the decrypted data corresponding to the particular sensitive data.

18. The non-transitory computer-readable medium of claim 17, wherein the operations further comprise:
    receiving a request for the public transfer key of the storage server that is associated with the transfer of the particular sensitive data from the data transfer application to the storage server;
    generating the public transfer key of the storage server, the public transfer key being signed with a private attestation identity key of the storage server; and
    transmitting the signed public transfer key to the data transfer service.

19. The non-transitory computer-readable medium of claim 17, wherein the operations further comprise:
    receiving a request from the data transfer service for a public attestation identity key that corresponds to the private attestation identity key of the storage server;

generating the public attestation identity key and the corresponding private attestation identity key; and transmitting the public attestation identity key to the data transfer service.

20. The non-transitory computer-readable medium of claim 19, wherein the public attestation identity key is signed by the storage server with a private endorsement key of the storage server, and wherein a public endorsement key corresponding to the private endorsement key is used by the storage server to verify the signed public attestation identity key of the storage server.

* * * * *

UNITED STATES PATENT AND TRADEMARK OFFICE
CERTIFICATE OF CORRECTION

PATENT NO. : 11,936,784 B2
APPLICATION NO. : 17/866344
DATED : March 19, 2024
INVENTOR(S) : Payne et al.

Page 1 of 1

It is certified that error appears in the above-identified patent and that said Letters Patent is hereby corrected as shown below:

In the Specification

In Column 11, Line 67, delete "OTA$_{Sek.}$" and insert -- DTA$_{Sek.}$ --, therefor.

In Column 13, Line 15, delete ""0:" and insert -- "O: --, therefor.

In Column 19, Line 26, delete "DTA$_S$)" and insert -- DTAs) --, therefor.

Signed and Sealed this
Twenty-third Day of July, 2024

Katherine Kelly Vidal
*Director of the United States Patent and Trademark Office*